US012563465B2

(12) United States Patent
Da Silva et al.

(10) Patent No.: US 12,563,465 B2
(45) Date of Patent: Feb. 24, 2026

---

(54) PRESERVING CELL GROUP ADDITION/CHANGE CONFIGURATION ON HANDOVER

(71) Applicant: Telefonaktiebolaget LM Ericsson (PUBL), Stockholm (SE)

(72) Inventors: Icaro Leonardo Da Silva, Solna (SE); Cecilia Eklöf, Täby (SE); Julien Muller, Rennes (FR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 498 days.

(21) Appl. No.: 17/999,141

(22) PCT Filed: May 20, 2021

(86) PCT No.: PCT/IB2021/054389
§ 371 (c)(1),
(2) Date: Nov. 17, 2022

(87) PCT Pub. No.: WO2021/234633
PCT Pub. Date: Nov. 25, 2021

(65) Prior Publication Data
US 2023/0209425 A1 Jun. 29, 2023

Related U.S. Application Data

(60) Provisional application No. 63/028,456, filed on May 21, 2020.

(51) Int. Cl.
*H04W 36/08* (2009.01)
*H04W 36/38* (2009.01)

(52) U.S. Cl.
CPC ........... *H04W 36/08* (2013.01); *H04W 36/38* (2013.01)

(58) Field of Classification Search
None
See application file for complete search history.

(56) References Cited

U.S. PATENT DOCUMENTS

2019/0075497 A1* 3/2019 Zhu ........................ H04W 36/08
2019/0116483 A1* 4/2019 Ryu ...................... H04W 4/029
2020/0154326 A1* 5/2020 Deenoo .............. H04W 36/362
2021/0105681 A1* 4/2021 Paladugu ........ H04W 36/00837
(Continued)

OTHER PUBLICATIONS

3GPP TSG-RAN WG2 Meeting #105; Athens, Greece; Source: Lenovo, Motorola Mobility; Title: CP flow for LTE conditional handover (R2-1901071)—Feb. 25-Mar. 1, 2019.
(Continued)

*Primary Examiner* — Xavier S Wong
(74) *Attorney, Agent, or Firm* — Baker Botts L.L.P.

(57) ABSTRACT
A method performed by a source master node performing a handover of a wireless device to a target node includes receiving, from a source secondary node, a first message comprising the secondary node configuration and a conditional reconfiguration. The source master node transmits, to the target node, a handover request message that includes an indication that the wireless device is configured with the conditional reconfiguration. The source master node receives, from the target node, a handover acknowledgement message indicating that the wireless device is to keep, modify, and/or release the conditional reconfiguration.

26 Claims, 19 Drawing Sheets

(56)        References Cited

U.S. PATENT DOCUMENTS

| | | | |
|---|---|---|---|
| 2022/0408323 A1* | 12/2022 | Ishii | H04W 36/0055 |
| 2023/0045700 A1* | 2/2023 | Wu | H04W 36/087 |

OTHER PUBLICATIONS

3GPP TSG-RAN WG2 #109e; Electronic meeting: Source: Ericsson; Tille: CHO and MR-DC operation (Tdoc R2-2003036)—Apr. 20-30, 2020.

3GPP TSG-RAN3 Meeting #105; Ljubljana, Slovenla; Change Request 37.340, Current version; 15.6.0 ; Tille: Introduction of conditional SN change procedure (R3-194117)~ Aug. 26-30, 2019.

3GPP TSG-RAN WG3 Meeting #107-bis-e; E-meeting; Source: Nokia, Nokia Shanghai Bell; Tille: (TP for NR_Mob_enh BL CR for TS 38.423): Completion of the open points related to the modification of a CHO (R3-201654)—Apr. 20-30, 2020.

3GPP TSG-RAN WG3 Meeting #107bis-e; Electronic Meeting; Change Request, 38.401 GR 0110 rev 4 Current version: 16.1.0:

Title: Baseline CR for introducing Rel-16 NR mobility enhancement (R3-202908)—Apr. 20-30, 2020.

PCT International Search Report issued for International application No., PCT/IB2021/054389 ~ Sep. 14, 2021.

PCT Written Opinion of the International Searching Authority issued for International application No. PCT/IB2021/054389—Sep. 14, 2021.

Korean Patent Office, Notice of Preliminary Rejection in Application No. KR 2022-7043729 dated Mar. 18, 2025 (with summary translation).

"Remining issue of conditional PSCCell addition and change," 3GPP TSG-RAN WG2 Meeting #108, R2-1914703; Reno, USA, Nov. 18-22, 2019.

"Major CHO issues not discussed in [108#66][NR Mob]" Ericsson, 3GPP TSG-RAN WG2 #109-e, Toc R2-2000330, Electronic Meeting, Feb. 24-Mar. 6, 2020.

Examination Report Issued by Intellectual Property India for Application No. 202217067916—Jun. 11, 2024.

Communication pursuant to Article 94(3) EPC in EP Application No. 21 728 638.4-1206 dated Jul. 17, 2025.

\* cited by examiner

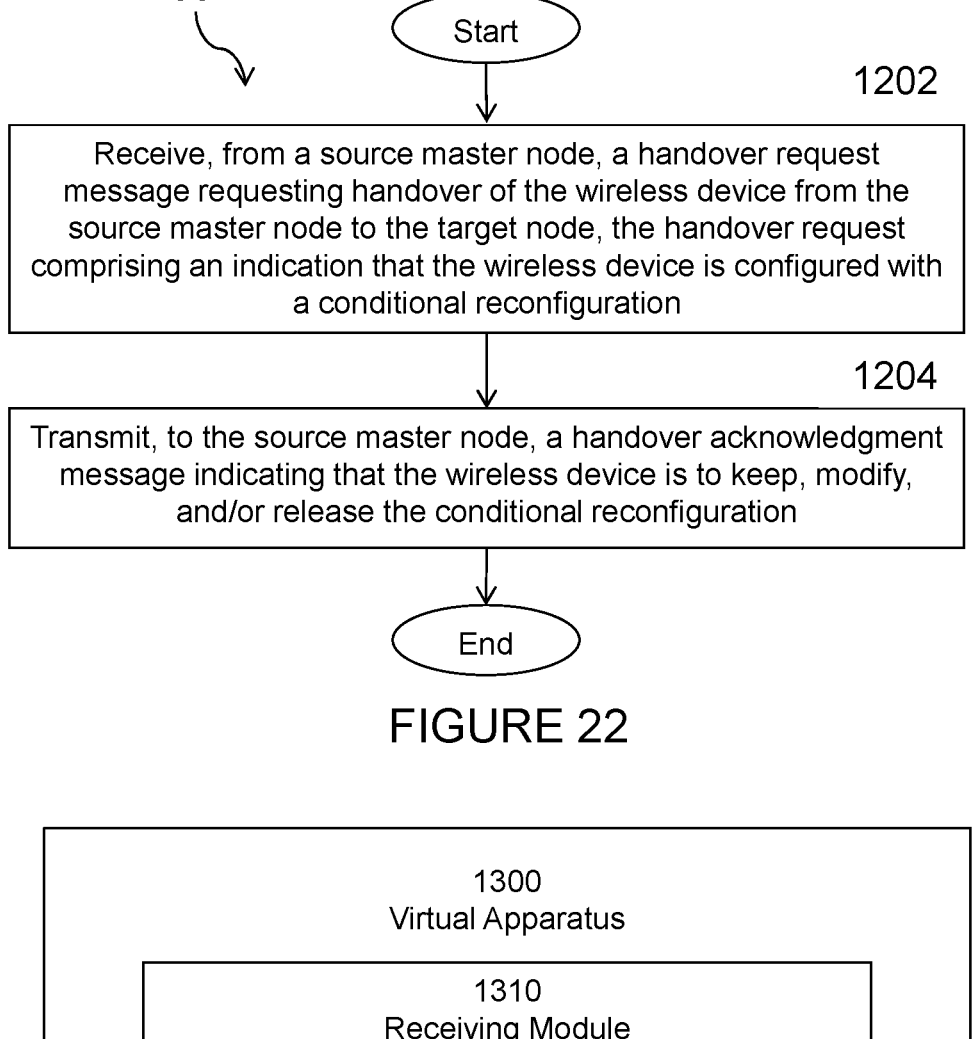

1200

Start

1202

Receive, from a source master node, a handover request message requesting handover of the wireless device from the source master node to the target node, the handover request comprising an indication that the wireless device is configured with a conditional reconfiguration

1204

Transmit, to the source master node, a handover acknowledgment message indicating that the wireless device is to keep, modify, and/or release the conditional reconfiguration End

FIGURE 22

1300
Virtual Apparatus

1310
Receiving Module

1320
Transmitting Module

FIGURE 23

PRESERVING CELL GROUP ADDITION/CHANGE CONFIGURATION ON HANDOVER

PRIORITY

This nonprovisional application is a U.S. National Stage Filing under 35 U.S.C. § 371 of International Patent Application Serial No. PCT/IB2021/054389 filed May 20, 2021 and entitled "Preserving Cell Group Addition/Change Configuration of Handover" which claims priority to U.S. Provisional Patent Application No. 63/028,456 filed May 21, 2020 both of which are hereby incorporated by reference in their entirety.

TECHNICAL FIELD

The present disclosure relates, in general, to wireless communications and, more particularly, systems and methods for preserving primary cell of the Secondary Cell Group (PSCell) Addition/Change (CPAC) configuration on handover.

BACKGROUND

Some mobility enhancements in long term evolution (LTE) and Fifth Generation (5G) New Radio (NR) improve the robustness at handover and decrease the interruption time at handover. One problem related to robustness at handover is that the handover (HO) Command (RRCConnectionReconfiguration with mobilityControlInfo and RRCReconfiguration with a reconfigurationWithSync field) is normally sent when the radio conditions for the user equipment (UE) are already quite bad. Thus, the HO Command may not reach the UE in time if the message is segmented or there are retransmissions.

In LTE and NR, different solutions to increase mobility robustness have been discussed. One solution discussed in NR is called "conditional handover" or "early handover command." To avoid the undesired dependence on the serving radio link upon the time (and radio conditions) where the user equipment (UE) should execute the handover, one option is providing radio resource control (RRC) signaling for the handover to the UE earlier. To achieve this, the HO command is associated with a condition. For example, the HO command may be associated with radio conditions similar to the ones associated with an A3 event, where a given neighbor becomes X db better than target. When the condition is fulfilled, the UE executes the handover in accordance with the provided handover command.

A particular example may be where the condition is that the quality of the target cell or beam becomes X dB stronger than the serving cell. The threshold Y used in a preceding measurement reporting event may be chosen lower than the one in the handover execution condition. This enables the serving cell to prepare the handover upon reception of an early measurement report and to provide the RRCConnectionReconfiguration with mobilityControlInfo at a time when the radio link between the source cell and the UE is still stable. The execution of the handover is done at a later point in time that is considered optimal for the handover execution.

FIG. 1 illustrates an example with just a serving and a target cell. In practice there may often be many cells or beams that the UE reported as possible candidates based on its preceding radio resource management (RRM) measurements. The network should then have the freedom to issue conditional handover commands for several of those candidates. The RRCConnectionReconfiguration for each of those candidates may differ, for example, in terms of the HO execution condition (reference signal (RS) to measure and threshold to exceed) as well as in terms of the random access (RA) preamble to be sent when a condition is met.

While the UE evaluates the condition, it should continue operating per its current RRC configuration, i.e., without applying the conditional HO command. When the UE determines that the condition is fulfilled, it disconnects from the serving cell, applies the conditional HO command, and connects to the target cell. These steps are equivalent to the current, instantaneous handover execution.

Conditional handover is described in Stage 2, 3GPP TS 38.300 in Chapter 9.2.3.4. A conditional handover (CHO) is defined as a handover that is executed by the UE when one or more handover execution conditions are met. The UE starts evaluating the execution condition(s) upon receiving the CHO configuration and stops evaluating the execution condition(s) once the execution condition(s) is met.

The following principles apply to CHO. The CHO configuration contains the configuration of CHO candidate cell(s) generated by the candidate gNodeB(s) (gNB(s)) and execution condition(s) generated by the source gNB. An execution condition may consist of one or two trigger condition(s) (CHO events A3/A5). Only single RS type is supported and at most two different trigger quantities (e.g., reference signal receive power (RSRP) and reference signal receive quality (RSRQ), RSRP and signal to interference and noise ratio (SINR), etc.) can be configured simultaneously for the evaluation of CHO execution condition of a single candidate cell.

Before any CHO execution condition is satisfied, upon reception of HO command (without CHO configuration), the UE executes the HO procedure as described in clause 9.2.3.2, regardless of any previously received CHO configuration. While executing CHO, i.e. from the time when the UE starts synchronization with target cell, UE does not monitor source cell. CHO may not be supported for next generation core (NG-C) based handover.

As in intra-NR radio access network (RAN) handover, in intra-NR RAN CHO, the preparation and execution phase of the conditional handover procedure is performed without involvement of the 5G core (5GC). For example, preparation messages are directly exchanged between gNBs. The release of the resources at the source gNB during the conditional handover completion phase is triggered by the target gNB.

FIG. 2 illustrates the basic Intra-AMF/UPF Conditional Handover scenario where neither the access and mobility management function (AMF) nor the user plane function (UPF) changes. As illustrated, the steps include:

0/1. Same as step 0, 1 in FIG. 9.2.3.2.1-1 of section 9.2.3.2.1.
2. The source gNB decides to use CHO.
3. The source gNB issues a Handover Request message to one or more candidate gNBs.
4. Same as step 4 in FIG. 9.2.3.2.1-1 of section 9.2.3.2.1.
5. The candidate gNB sends HANDOVER REQUEST ACKNOWLEDGE message including configuration of CHO candidate cell to the source gNB.
6. The source gNB sends an RRCReconfiguration message to the UE, containing the configuration of CHO candidate cell(s) and CHO execution condition(s).
7. UE sends an RRCReconfigurationComplete message to the source gNB.
8. UE maintains connection with source gNB after receiving CHO configuration, and starts evaluating the CHO execution conditions for the candidate cell(s). If at least one CHO candidate cell satisfies the corresponding CHO execution condition, the UE detaches from the source gNB, applies the stored corresponding configuration for that selected candidate cell, synchronizes to that candidate cell and completes the RRC handover procedure by sending RRCReconfigurationComplete message to the target gNB. The UE releases stored CHO configurations after successful completion of RRC handover procedure.

The UE can be configured with dual connectivity (DC), communicating both via an MCG (Master Cell Group) and an SCG (Secondary Cell Group). When the UE is configured with dual connectivity, the UE is configured with two medium access control (MAC) entities: one MAC entity for the MCG and one MAC entity for the SCG. In multi-radio dual connectivity (MR-DC), the cell groups are located in two different logical nodes, i.e. different NG-RAN nodes, possibly connected via a non-ideal backhaul, one of the logical nodes provides NR access and the other one provides either Evolved-Universal Terrestrial Radio Access Network (E-UTRA) or NR access. One node acts as the MN (Master Node) and the other as the SN (Secondary Node). The MN and SN are connected via a network interface and at least the MN is connected to the core network.

The operation in MR-DC involves different reconfiguration procedures, like secondary node addition, secondary node modification, secondary node release and secondary node change.

FIG. 3 illustrates an example signaling flow for the Secondary Node Change initiated by the SN as disclosed in 3GPP TS 37.340 for the SN-initiated SN change, also referred to as PSCell Change (PC). Therein, the UE is operating in MR-DC, i.e. connected to an MN and a Source SN (S-SN). S-SN decides to move the UE to a Target SN (T-SN), possibly based on reported measurements on S-SN and/or T-SN frequencies. As illustrated, the steps include:

1. The source SN initiates the SN change procedure by sending SgNB Change Required message which contains target SN ID information and may include the SCG configuration (to support delta configuration) and measurement results related to the target SN.

2/3. The MN requests the target SN to allocate resources for the UE by means of the SgNB Addition procedure, including the measurement results related to the target SN received from the source SN. If forwarding is needed, the target SN provides forwarding addresses to the MN. The target SN includes the indication of the full or delta RRC configuration.

4/5. The MN triggers the UE to apply the new configuration. The MN indicates the new configuration to the UE in the RRCConnectionReconfiguration message including the NR RRC configuration message generated by the target SN. The UE applies the new configuration and sends the RRCConnectionReconfigurationComplete message, including the encoded NR RRC response message for the target SN, if needed. In case the UE is unable to comply with (part of) the configuration included in the RRCConnectionReconfiguration message, it performs the reconfiguration failure procedure.

6. If the allocation of target SN resources was successful, the MN confirms the release of the source SN resources. If data forwarding is needed the MN provides data forwarding addresses to the source SN. If direct data forwarding is used for SN terminated bearers, the MN provides data forwarding addresses as received from the target SN to source SN. Reception of the SgNB Change Confirm message triggers the source SN to stop providing user data to the UE and, if applicable, to start data forwarding.

7. If the RRC connection reconfiguration procedure was successful, the MN informs the target SN via SgNB Reconfiguration Complete message with the encoded NR RRC response message for the target SN, if received from the UE.

8. The UE synchronizes to the target SN.

9. For SN terminated bearers using radio link control (RLC) acknowledged mode (AM), the source SN sends the SN Status Transfer, which the MN sends then to the target SN, if needed.

10. If applicable, data forwarding from the source SN takes place. It may be initiated as early as the source SN receives the SgNB Change Confirm message from the MN.

11. The source SN sends the Secondary RAT Data Usage Report message to the MN and includes the data volumes delivered to and received from the UE over the NR radio for the related EPS radio access bearers (E-RABs).

The order the source SN sends the Secondary RAT Data Usage Report message and performs data forwarding with MN/target SN is not defined. The SgNB may send the report when the transmission of the related bearer is stopped.

12-16. If applicable, a path update is triggered by the MN.

17. Upon reception of the UE Context Release message, the source SN releases radio and C-plane related resources associated to the UE context. Any ongoing data forwarding may continue.

Current specifications may include a conditional PSCell change (CPC) procedure. Therein, a UE operating in MR-DC receives an RRC Reconfiguration (e.g. an RRCReconfiguration message) containing an SCG configuration (e.g. an secondaryCellGroup of IE CellGroupConfig) with a reconfigurationWithSync that is stored and associated to an execution condition (e.g. a condition like an A3 event configuration), so that stored message is only applied upon the fulfillment of the execution condition, which may be associated with the serving PSCell. Upon fulfillment of the execution condition, the UE would perform PSCell change (in case it find a neighbor cell that is better than the current SpCell of the SCG).

Some specifications may include PSCell Addition, i.e. conditional PSCell addition/change (CPAC). In Rel-16, only intra-SN CPC without MN involvement is included. Inter SN PSCell CPC and CPC with MN involvement will be included in Rel-17.

CPAC includes the following requirements/features. One PScell is active at a time even with conditional PScell change. For conditional PScell change, Event A3/Event A5 execution condition may be supported. For conditional SN change, the source SN configuration can be used as the reference in generation of delta signaling for the candidate SNs.

Both the execution condition and the configuration for the candidate PSCell (as a container) can be included in the RRCReconfiguration message generated by the SN for intra-SN conditional PSCell change initiated by the SN (without MN involvement). Signal Radio Bearer (SRB) 1 can be used in all cases. SRB3 may be used to transmit conditional PScell change configuration to the UE for intra-SN change without MN involvement. There is a limit to intra-SN change without MN involvement (i.e. no MN reconfiguration or decision needed but SRB1 can be used) in Rel-16.

Usage of CPAC is decided by the network. The UE evaluates when the condition is valid. CPAC supports configuration of one or more candidate cells for CPAC. CPAC may have multiple triggering conditions (using "and") for CPAC execution of a single candidate cell. Only single RS type per CPAC candidate is supported. At most two triggering quantities (e.g. RSRP and RSRQ, RSRP and SINR, etc.) can be configured simultaneously.

An execution condition for conditional PSCell change is defined by the measurement identity that identifies a measurement configuration. Cell level quality is used as baseline for Conditional NR PSCell change execution condition. Only single RS type (Synchronization Signal Block (SSB) or Channel State Information-Reference Signal (CSI-RS)) per candidate PSCell is supported for PSCell change. At most, two triggering quantities (e.g. RSRP and RSRQ, RSRP and SINR, etc.) can be configured simultaneously.

Time to trigger (TTT) is supported for CPAC execution condition (as per legacy configuration). No additional optimizations with multi-beam operation are included to improve random access channel (RACH) performance for conditional PSCell change completion with multi-beam operation.

For Frequency Range-1 (FR1) and Frequency Range-2 (FR2), the UE implementation is free to select the candidate PSCell if more than one candidate cell meets the triggering condition. UE may consider beam information in this.

The UE is not required to continue evaluating the triggering condition of other candidate PSCell(s) during conditional SN execution.

Similar to CHO, the following applies to CPC-intra-SN configuration. The RRCReconfiguration/RRCConnectionReconfiguration procedure may be reused to signal CPC-intra-SN configuration to UE. The MN is not allowed to alter any content of the configuration from the SN that is carried in an RRC container. Multiple candidate PSCells can be sent in either one or multiple RRC messages. The add/mod list+release list may be used to configure multiple candidate PSCells. CPC-intra-SN execution condition and/or candidate PSCell configuration can be updated by the SN (i.e. by modifying the existing CPC-intra-SN configuration).

After the CPC-intra-SN procedure is executed successfully, the UE releases all CPC-intra-SN configurations stored on the UE side. Upon the successful completion of conventional PSCell change procedure, the UE releases all CPC-intra-SN configurations. The SCG failure information procedure can be used for CPC-intra-SN procedure failure (due to Radio Link Failure (RLF), T304-like timer expiry or compliance check failure).

When using SRB3, the MN may not be informed of CPC-intra-SN execution by the UE. If SRB3 is not configured, the UE first informs the MN that the message has been received. Then the UE needs to provide the CPC complete message to the SN via the MN upon CPC execution.

CPC reuses the Information Element (IE) defined for CHO. The field name of the IE could be changed to reflect that the IE is used for both CHO and CPC.

While executing CPC procedure, the UE continues to receive RRC reconfiguration from the MN. However, the UE should finalize the ongoing CPC execution before processing the RRC message received from the MN (same as in the conventional PSCell change).

As in legacy PSCell change, the UE sends RRCReconfigurationComplete to the MN at execution of CPC when no SRB3 is configured and the MN informs the SN. Thus, the complete message received by the MN includes an embedded complete message to the SN.

Upon RLF on Primary Cell (PCell) during the execution of Conditional PSCell change for intra-SN change without MN involvement, the UE supports the Rel-16 MR-DC procedures. For example, the UE performs connection re-establishment procedure without any fast MCG link recovery.

Support of CHO and CPC-intra-SN configuration simultaneously is not considered in Rel-16. It's left up to the network solution to ensure there is no simultaneous CHO and CPC configuration.

Reconfirm the use of SCG failure information upon declaring SCG failure in the procedure of the conditional PSCell change. Thus, the message SCGFailureInformation will be sent in case of SCG failure for conditional PSCell change as well as PSCell change.

When the conditional PSCell configuration received over SRB3 is invalid, UE initiates SCG failure information procedure to report to the MN about the SN change failure due to invalid configuration (legacy procedure).

Like CHO, UE shall follow the below procedures for handling the T310 and T304 timers during conditional PSCell addition/change procedure for EN-DC, NGEN-DC, NR-DC cases. The UE shall not stop MN T310 or SN T310 and shall not start T304 when it receives configuration of a CPC-intra-SN. The timer T310 (SN only in case of SN Change) is stopped and timer T304-like is started when the UE begins execution of a CPC-intra-SN.

UE checks the validity of conditional PSCell change execution criteria configuration immediately on receiving the conditional PSCell change RRC Reconfiguration message, which may either be embedded in the MN RRC message received over SRB1 or received over SRB3 (same as CHO).

The specification is not changed regarding compliance checking of embedded Reconfiguration message containing configuration of conditional PSCell candidate (same as for CHO).

UE performs connection re-establishment procedure or actions upon going to RRC_IDLE when the conditional PSCell configuration received over SRB1 is invalid. Thus, UE cannot comply with the embedded PSCell configuration for intra-SN Change.

When CPC configuration is provided over SRB3, the UE does not inform the MN when CPC execution condition is fulfilled and the UE starts executing CPC. Additionally, a threshold parameter is not introduced to determine PCell quality for execution of CPC.

Upon transmission of SCG failure information to the network, the UE stops evaluating the CPC execution criteria according to the current CPC configuration until a response is received from the network. It is left to UE implementation as to whether the UE continues measurements for candidate PSCells configured for execution condition upon CPC failure.

The content of FailureReportSCG for CPC procedure failure should include failureType, measResultFreqList and measuResultSCG-Failure. These parameters are set according to the exiting SCGFailureInformation procedure.

Use ULInformationTransferMRDC instead of RRCReconfigurationComplete message to inform the network of CPC execution when no SRB3 is configured and the MN informs the SN, i.e. ULInformationTransferMRDC message to MN includes an embedded RRCReconfigurationComplete message to the SN. This applies to both NR MN and LTE MN.

If the CPC configuration is not released by network, the UE autonomously releases the stored CPC configuration upon the SCG release. The measID and reportConfig associated with CPC configuration and measObject(s) only associated to CPC shall be autonomously removed by the UE when the SCG is released. Support of CPC configuration (CPC condition+CPC reconfiguration) in legacy HO command or CPC configuration in CPC configuration is not be considered in Rel-16.

At handover, information about the current UE configuration is transferred from source to target node by means of inter-node RRC messages. The content of the inter-node RRC messages is described in the RRC specification 3GPP TS 38.331. These messages are not sent to the UE but are transmitted in network signaling as information about what the UE is configured with, the UE context. For further information see chapter 11 in 3GPP TS 38.331.

The following describes RRC messages that are transferred between network nodes. These RRC messages may be transferred to or from the UE via another radio access technology (RAT). Consequently, these messages have similar characteristics as the RRC messages that are transferred across the NR radio interface, i.e. the same transfer syntax and protocol extension mechanisms apply.

Inter-node RRC messages are RRC messages that are sent either across the X2-, Xn- or the NG-interface, either to or from the gNB. For example, a single 'logical channel' is used for all RRC messages transferred across network nodes. The information could originate from or be destined for another RAT.

The SN modification procedure is described in 3GPP TS 37.340 in Chapter 10.3. For EN-DC, the secondary node modification procedure may be initiated either by the MN or by the SN and be used to modify, establish or release bearer contexts, to transfer bearer contexts to and from the SN or to modify other properties of the UE context within the same SN. It may also be used to transfer an NR RRC message from the SN to the UE via the MN and the response from the UE via MN to the SN (e.g. when SRB3 is not used).

The Secondary Node modification procedure does not necessarily need to involve signaling towards the UE. FIG. 4 illustrates a SN Modification procedure as initiated by the MN.

The MN uses the procedure to initiate configuration changes of the SCG within the same SN, e.g. the addition, modification or release of SCG bearer(s) and the SCG RLC bearer of split bearer(s), as well as configuration changes for SN terminated MCG bearers. Bearer termination point change is realized by adding the new bearer configuration and releasing the old bearer configuration within a single MN initiated SN Modification procedure for the respective E-RAB.

The MN uses this procedure to perform handover within the same MN while keeping the SN. The MN also uses the procedure to query the current SCG configuration such as, for example, when delta configuration is applied in an MN initiated SN change. The MN also uses the procedure to provide the S-RLF related information to the SN. The MN may not use the procedure to initiate the addition, modification or release of Secondary Cell Group (SCG) Secondary Cells (SCells). The SN may reject the request, except if it concerns the release of SN terminated bearer(s) or the SCG RLC bearer of MN terminated bearer(s), or if it is used to perform handover within the same MN while keeping the SN.

As depicted in FIGURE, the steps include:

1. The MN sends the SgNB Modification Request message, which may contain bearer context related or other UE context related information, data forwarding address information (if applicable) and the requested SCG configuration information, including the UE capability coordination result to be used as basis for the reconfiguration by the SN. If a security key update in the SN is required, a new SgNB Security Key is included. For SCG RLC re-establishment for E-RABs configured with an MN terminated bearer with an SCG RLC bearer for which no bearer type change is performed, the MN provides a new uplink GPRS Tunneling Protocol (GTP) tunnel endpoint to the SN. The SN shall continue sending uplink (UL) packet data convergence protocol (PDCP) protocol data units (PDUs) to the MN with the previous UL GTP tunnel endpoint until it re-establishes the RLC and use the new uplink GTP tunnel endpoint after re-establishment. For PDCP re-establishment for E-RABs configured with an SN terminated bearer with an MCG RLC bearer for which no bearer type change is performed, the MN provides a new downlink (DL) GTP tunnel endpoint to the SN. The SN shall continue sending DL PDCP PDUs to the MN with the previous DL GTP tunnel endpoint until it performs PDCP re-establishment and use the new DL GTP tunnel endpoint starting with the PDCP re-establishment.

2. The SN responds with the SgNB Modification Request Acknowledge message, which may contain SCG radio resource configuration information within a NR RRC configuration message and data forwarding address information (if applicable). For a security key update (with or without PSCell change), for E-RABs configured with the MN terminated bearer option that require X2-U resources between the MN and the SN, for which no bearer type change is performed, the SN provides a new DL GTP tunnel endpoint to the MN. The MN shall continue sending DL PDCP PDUs to the SN with the previous DL GTP tunnel endpoint until it performs PDCP re-establishment or PDCP data recovery. The MN shall use the new DL GTP tunnel endpoint starting with the PDCP re-establishment or data recovery. In case of a security key update (with or without PSCell change), for E-RABs configured with the SN terminated bearer option that require X2-U resources between the MN and the SN, for which no bearer type change is performed, the SN provides a new UL GTP tunnel endpoint to the MN. The MN shall continue sending UL PDCP PDUs to the SN with the previous UL GTP tunnel endpoint until it re-establishes the RLC and use the new UL GTP tunnel endpoint after re-establishment.

3-5. The MN initiates the RRC connection reconfiguration procedure, including the NR RRC configuration message. The UE applies the new configuration, synchronizes to the MN (if instructed, in case of intra-MN handover) and replies with RRCConnectionReconfigurationComplete, including a NR RRC response message, if needed. In case the UE is unable to comply with (part of) the configuration included in the RRCConnectionReconfiguration message, the UE performs the reconfiguration failure procedure.

6. Upon successful completion of the reconfiguration, the success of the procedure is indicated in the SgNB Reconfiguration Complete message.

7. If instructed, the UE performs synchronization towards the PSCell of the SN as described in SgNB addition procedure. Otherwise, the UE may perform UL transmission after having applied the new configuration.

8. If PDCP termination point is changed for bearers using RLC AM, and when RRC full configuration is not used, the SN Status Transfer takes place between the MN and the SN. FIG. 4 depicts the case where a bearer context is transferred from the MN to the SN.

The SN may not be aware that a SN terminated bearer requested to be released is reconfigured to a MN terminated bearer. The SN Status for the released SN terminated bearers with RLC AM may also be transferred to the MN.

9. If applicable, data forwarding between MN and the SN takes place. FIG. 4 depicts the case where a bearer context is transferred from the MN to the SN.

10. The SN sends the Secondary RAT Data Usage Report message to the MN and includes the data volumes delivered to and received from the UE over the NR radio for the E-RABs to be released and for the E-RABs for which the S1 UL GTP Tunnel endpoint was requested to be modified.

The order the SN sends the Secondary RAT Data Usage Report message and performs data forwarding with MN is not defined. The SN may send the report when the transmission of the related bearer is stopped.

11. If applicable, a path update is performed.

There currently exist certain challenges. For example, particular problems exist with handover (inter-MN handover) of a UE having a connection with a MN and a SN and, thus, is said to be operating in Dual Connectivity and, at the same time, is configured with a CPC or CPA.

More specifically, the problem is that CPC and/or CPA is configured by the SN and may not be known at the source MN. Thus, CPC and/or CPA is currently not part of the UE Context, which includes RRC configurations transmitted in a container in the HANDOVER REQUEST message that is transmitted between source MN and target MN. Thus, the target MN is not able to take appropriate decisions concerning the UE's target configuration to be applied at the target cell, such as indicate to the UE to keep CPC configurations, remove CPC configuration or change/modify CPC configurations.

In an inter-MN handover of a UE in MR-DC, before the MN sends a Handover Request to a target MN, it can retrieve the SCG configuration from the SN, using the MN triggered SN modification, as described above. The SN responds with an SN Modification Request Acknowledge message including the S-NR-RAN node to M-NG-RAN node Container, which is an OCTET STRING that includes the CG-Config message as defined in subclause 11.2.2 of 3GPP TS 38.331, shown below:

---
CG-Config message
---

```
-- ASN1START
-- TAG-CG-CONFIG-START
. . .
CG-Config-IEs ::=          SEQUENCE {
    scg-CellGroupConfig           OCTET STRING (CONTAINING
RRCReconfiguration)    OPTIONAL,
    scg-RB-Config              OCTET STRING (CONTAINING
RadioBearerConfig)    OPTIONAL,
    nonCriticalExtension          CG-Config-v1540-IEs
OPTIONAL
}
. . .
```

The scg-CellGroupConfig contains the RRCReconfiguration message (containing only secondaryCellGroup and/or measConfig). It also includes the current SCG configuration of the UE, when provided in response to a query from MN, or in SN-triggered SN change to enable delta signaling by the target SN. In this case, the SN sets the RRCReconfiguration message in accordance with clause 11.2.3 of 3GPP TS 38.331. This field may not be applicable in NE-DC.

The scg-RB-Config contains the IE RadioBearerConfig which includes the current SCG RB configuration of the UE, when provided in response to a query from MN or in SN triggered SN change or bearer type change between SN terminated bearer to MN terminated bearer in order to enable delta signaling by the MN or target SN. In this case, the SN sets the RadioBearerConfig in accordance with clause 11.2.3 of 3GPP TS 38.331.

As described above, upon MN request to SN, the SN may respond the MN and include only the current SCG configuration of the UE and the current SCG RB configuration of the UE. In other words, SN may not include CPC and/or CPA related configurations.

The MN can request a handover to a target MN by transmitting a HANDOVER REQUEST message, which contains the UE's current configuration as defined in the ddmessage, as follows:

---
HandoverPreparationInformation message
---

```
-- ASN1START
-- TAG-HANDOVER-PREPARATION-INFORMATION-START
. . .
HandoverPreparationInformation-IEs ::= SEQUENCE {
. . .
    sourceConfig            AS-Config            OPTIONAL, --
Cond HO
. . .
}
AS-Config ::=              SEQUENCE {
    rrcReconfiguration            OCTET STRING (CONTAINING
RRCReconfiguration),
    ...,
    [[
    sourceRB-SN-Config            OCTET STRING (CONTAINING
RadioBearerConfig)    OPTIONAL,
    sourceSCG-NR-Config           OCTET STRING (CONTAINING
RRCReconfiguration)    OPTIONAL,
. . .
}
-- TAG-HANDOVER-PREPARATION-INFORMATION-STOP
-- ASN1STOP
. . .
```

The AS-Config includes the following fields. The rrcReconfiguration field contains the RRCReconfiguration configuration as generated entirely by the MN. The sourceRB-SN-Config field contains the IE RadioBearerConfig as generated entirely by the SN. This field is only used when the UE is configured with SN terminated RB(s). The sourceSCG-NR-Config field contains the current dedicated SCG configuration in RRCReconfiguration message as generated entirely by the SN. In this version of the specification, the RRCReconfiguration message can only include fields secondaryCellGroup and measConfig. This field is only used in NR-DC.

As described above, the information the source MN transmits to the target MN in the Handover Request message only contain the UE's current configuration such as, for example, a current SCG configuration.

SUMMARY

Certain aspects of the present disclosure and their embodiments may provide solutions to these or other challenges. For example, some embodiments relate to and are performed by a wireless device such as a user equipment (UE) in Multi-Radio Dual Connectivity (MR-DC) and configured with conditional reconfiguration such as, for example, Conditional PSCell Change (CPC) and/or Conditional PSCell Addition (CPA). As another example, some embodiments relate to and are performed by a first network node operating as a source Master Node (MN) for a UE configured with MR-DC and configured with conditional reconfiguration.

According to certain embodiments, a method performed by a source master node performing a handover of a wireless device to a target node includes receiving, from a source secondary node, a first message comprising the secondary node configuration and a conditional reconfiguration. The source master node transmits, to the target node, a handover request message. The handover request message comprises an indication that the wireless device is configured with the conditional reconfiguration. The source master node receives, from the target node, a handover acknowledgement message indicating that the wireless device is to keep, modify, and/or release the conditional reconfiguration.

According to certain embodiments, a source master node for performing a handover of a wireless device to a target node includes processing circuitry configured to receive, from a source secondary node, a first message comprising the secondary node configuration and a conditional reconfiguration. The processing circuitry is configured to transmit, to the target node, a handover request message. The handover request message comprises an indication that the wireless device is configured with the conditional reconfiguration. The processing circuitry is configured to receive, from the target node, a handover acknowledgement message indicating that the wireless device is to keep, modify, and/or release the conditional reconfiguration.

According to certain embodiments, a method performed by a target node performing a handover of a wireless device from a source master node includes receiving, from the source master node, a handover request message requesting handover of the wireless device from the source master node to the target node. The handover request comprises an indication that the wireless device is configured with a conditional reconfiguration. The target node transmits, to the source master node, a handover acknowledgement message indicating that the wireless device is to keep, modify, and/or release the conditional reconfiguration.

According to certain embodiments, a target node for performing a handover of a wireless device from a source master node includes processing circuitry configured to receive, from the source master node, a handover request message requesting handover of the wireless device from the source master node to the target node. The handover request comprises an indication that the wireless device is configured with a conditional reconfiguration. The processing circuitry is configured to transmit, to the source master node, a handover acknowledgement message indicating that the wireless device is to keep, modify, and/or release the conditional reconfiguration.

Certain embodiments may provide one or more of the following technical advantages. For example, one technical advantage may be that particular embodiments facilitate keeping, releasing, or modifying CPAC configurations in the UE even when the MN is changed. The information about the CPAC configuration may be transferred in network signaling to the target MN and may be transferred subsequently to the target SN. It saves signaling towards the UE as the existing configuration can be kept or possibly modified instead of having to send the complete configuration again to the UE after the MN has been changed. As another example, a technical advantage may be that certain embodiments increase the robustness of the Dual Connectivity connection in case the SN radio link fails before the target MN is able to reconfigure the UE.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 22 illustrates an example method by a network node, according to certain embodiments; and FIG. 23 illustrates another exemplary virtual computing device, according to certain embodiments.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Figure 5:
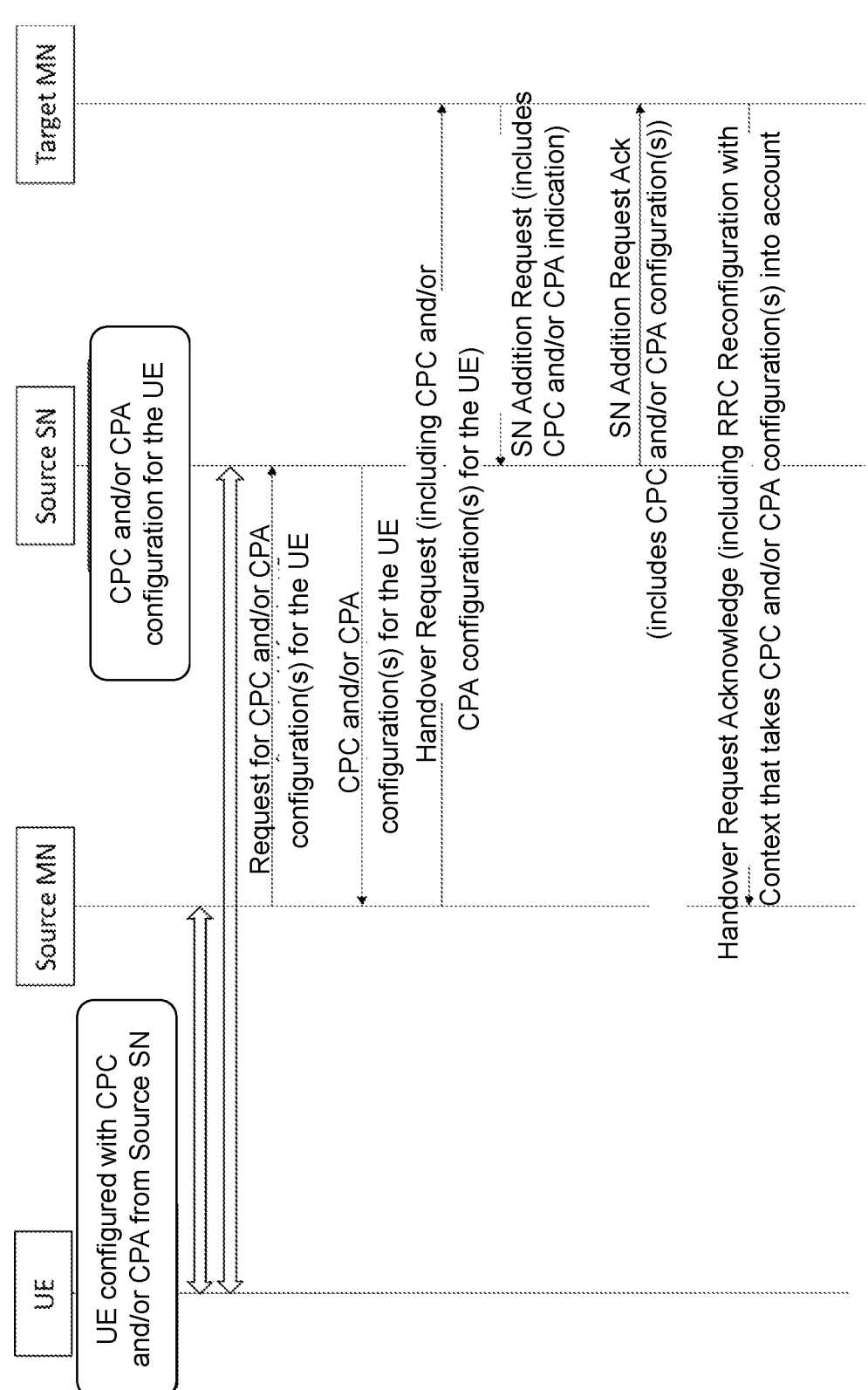
FIG. 5 illustrates an example signaling diagram for signaling between a user equipment (UE), a master SN, and a target node for providing the UE's current secondary node (SN) configuration and conditional reconfiguration, according to certain embodiments.

FIG. 5 illustrates an example signaling diagram for signaling between a UE, a master secondary node (SN), and a target node for providing the UE's current secondary node (SN) configuration and conditional reconfiguration.

Certain embodiments disclosed herein relate to methods and systems in a user equipment (UE) configured with Multi-Radio Dual Connectivity (MR-DC) and configured with conditional reconfiguration such as, for example, Conditional PSCell Change (CPC) and Conditional PSCell Addition (CPA). FIG. 5 illustrates an example signaling diagram for providing a UE's current secondary node (SN) configuration For example, according to certain embodiments, the method includes transmitting a message requesting the source secondary node (S-SN) to provide the UE's current secondary node (SN) configuration. According to certain particular embodiments, the message may include any of the following messages: a SN Modification Request; a S-NODE MODIFICATION REQUEST message (NR); a Secondary eNodeB (SENB) MODIFICATION REQUEST message (LTE); and an Secondary gNodeB (SGNB) MODIFICATION REQUEST message (EN-DC); and/or a SGNB MODIFICATION REQUEST message (EN-DC). In particular embodiments the request for UE's current SN configuration may be a request for CPC and/or CPA configuration(s) that may have been configured by the SN. In particular embodiments, the request for UE's current SN configuration is a request for measurement configurations associated with CPC and/or CPA configuration(s) that may have been configured by the SN.

According to certain embodiments, the method may further include receiving a message from the source SN (S-SN) including UE's current configuration from the source SN (S-SN) including information related to a Conditional PSCell Addition/Change configuration with which the UE is configured. In certain particular embodiments, the message may include any of the following messages: a SN Modification Request Acknowledge; a S-NODE MODIFICATION REQUEST ACKNOWLEDGE message (NR); a SENB MODIFICATION REQUEST ACKNOWLEDGE message (LTE); a SGNB MODIFICATION REQUEST ACKNOWL-EDGE message (EN-DC); and a SGNB MODIFICATION REQUEST ACKNOWLEDGE message (EN-DC). In particular embodiments, the message may include CPC and/or CPA configuration(s) that may have been configured for and/or to the UE by the SN. In particular embodiments, the message includes a measurement configuration related to CPC and/or CPA configuration(s) that may have been configured by the SN to the UE. In particular embodiments, the message may include the CG-Config containing the UEs CPAC configurations in source SN. This may indicate to the source MN that the UE is configured with CPA and/or CPC by the SN.

According to certain embodiments, the method may further include transmitting a HANDOVER REQUEST message to a target MN node. The message contains an indication to the target node (target MN) that the UE is configured with CPC and/or CPA. In particular embodiments, the indication to the target node (target MN) that the UE is configured with CPC and/or CPA may be included in a HandoverPreparationInformation message with current source configuration. The HandoverPreparationInformation may contain the UEs CPAC configurations in the source SN. In particular embodiments, the indication to the target node (target MN) that the UE is configured with CPC and/or CPA is included in an inter-node RRC message or as an IE of an XnAP inter-node message. In particular embodiments, the indication includes the CPC and CPA configuration that the UE is currently configured with. Thus, the indication may include the stored RRC Reconfigurations for the UE, the measId(s) associated to each RRC Reconfiguration, the associated measurement configuration for the measId(s), measurement objects, reporting configurations whose report type is associated with CPC and/or CPA, etc.

According to certain embodiments, the method may further include receiving a HANDOVER REQUEST ACKNOWLEDGE message from a target MN. In particular embodiments, the message from the target MN may contain an RRC reconfiguration message (e.g. RRCReconfiguration) containing a reconfigurationWithSync with a request to handover to the target MN, including CPC and/or CPA configuration(s) indicating the UE to keep, modify and/or release CPC and/or CPA configuration(s).

According to certain embodiments, the method may further include transmitting to the UE an RRC reconfiguration message (e.g. RRCReconfiguration) containing a reconfigurationWithSync with a request to handover to the target MN, including CPC and/or CPA configuration(s) indicating the UE to keep, modify and/or release CPC and/or CPA configuration(s).

Certain other embodiments relate to methods and systems in a network node operating as a source Master Node (MN) for a UE configured with MR-DC and configured with conditional reconfiguration.

For example, according to certain embodiments, the method includes receiving a message from a Source MN requesting the source SN (S-SN) to provide the UE's current SN configuration. In certain particular embodiments, the message may include any one of the following messages: a SN Modification Request; a S-NODE MODIFICATION REQUEST message (NR); a SENB MODIFICATION REQUEST message (LTE); a SGNB MODIFICATION REQUEST message (EN-DC); and a SGNB MODIFICATION REQUEST message (EN-DC). In particular embodiments, the request for UE's current SN configuration may be a request for CPC and/or CPA configuration(s) that may have been configured by the SN. In particular embodiments, the request for UE's current SN configuration may be a request for measurement configurations associated with CPC and/or CPA configuration(s) that may have been configured by the SN.

For example, according to certain embodiments, the method includes transmitting a message to the source MN including UE's current configuration from the source SN (S-SN) including information related to Conditional PSCell Addition/Change the UE is configured with. In particular embodiments, the message may include any of the following messages: a SN Modification Request Acknowledge; a S-NODE MODIFICATION REQUEST ACKNOWLEDGE message (NR); a SENB MODIFICATION REQUEST ACKNOWLEDGE message (LTE); a SGNB MODIFICATION REQUEST ACKNOWLEDGE message (EN-DC); and a SGNB MODIFICATION REQUEST ACKNOWLEDGE message (EN-DC). In particular embodiments, the message may include CPC and/or CPA configuration(s) that may have been configured by the SN to the UE. In particular embodiments, the message includes measurement configuration related to CPC and/or CPA configuration(s) that may have been configured by the SN to the UE. In particular embodiments, the message includes the CG-Config containing the UEs CPAC configurations in source SN. This may indicate to the source MN that the UE is configured with CPA and/or CPC by the SN.

Certain other embodiments may relate to systems and methods for a network node operating as target Master Node (MN). For example, according to certain embodiments, the method includes receiving a HANDOVER REQUEST message from a source MN node. The message contains an indication to the target node (target MN) that the UE is configured with CPC and/or CPA.

In particular embodiments, the indication to the target node (target MN) that the UE is configured with CPC and/or CPA may be included in a HandoverPreparationInformation message with current source configuration. The HandoverPreparationInformation may contain the UEs CPAC configurations in source SN.

In particular embodiments, the indication to the target node (target MN) that the UE is configured with CPC and/or CPA may be included in an inter-node RRC message or as an IE of an XnAP inter-node message. In particular embodiments, the indication may include the CPC and CPA configuration that the UE is currently configured with. For example, the indication may include stored RRC Reconfigurations, the measId(s) associated to each RRC Reconfiguration, the associated measurement configuration for the measId(s), measurement objects, reporting configurations whose report type is associated with CPC and/or CPA, etc.

In particular embodiments, the message may include a UE context ID at the SN (i.e. at the source SN). Then, upon receiving the HANDOVER REQUEST, the target MN may determine to keep the SN and transmit, to the Source SN, a message that includes the UE context ID at the SN. In particular embodiments, the message may include any of the following messages: a S-NODE ADDITION/MODIFICATION REQUEST in NR; a SENB ADDITION/MODIFICATION REQUEST messages in LTE; and a SGNB ADDITION/MODIFICATION REQUEST messages in EN-DC. Upon reception of the message, the Source SN may identify that the UE is configured with the CPC and/or CPA and, when creating the SN's configuration to be provided to the target MN and forwarded to the source MN, the source SN may include configurations for the UE to add, releases, or modifies CPC and/or CPA configurations at the UE such as, for example, in an RRC Reconfiguration that is included in another message (a response message) that is transmitted to the target MN.

In particular embodiments, upon reception of the HANDOVER REQUEST the target MN transmits to the Source SN a message including the CG-ConfigInfo containing the UEs CPAC configurations in source SN. In particular embodiments, the message comprises any of the following messages: a S-NODE ADDITION/MODIFICATION REQUEST in NR; a SENB ADDITION/MODIFICATION REQUEST messages in LTE; a SGNB ADDITION/MODIFICATION REQUEST messages in EN-DC. Upon reception of the message, the Source SN may identify that the UE is configured with CPC and/or CPA and, when creating the SN's configuration to be provided to the target MN and forwarded to the source MN, the source SN may include the configurations for the UE to add, releases, or modifies CPC and/or CPA configurations at the UE. In a particular embodiment, for example, the configurations may be provided in an RRC Reconfiguration that is included in another message such as a response message, for example, that is transmitted to the target MN.

In particular embodiments, the target MN may receive from the source SN a response message including an RRC Reconfiguration including indications to remove, add, or modify CPA and/or CPC configuration(s). In particular embodiments, the message comprises any of the following messages: a S-NODE ADDITION/MODIFICATION REQUEST in NR; a SENB ADDITION/MODIFICATION REQUEST messages in LTE; a SGNB ADDITION/MODIFICATION REQUEST messages in EN-DC.

According to certain embodiments, the method also includes transmitting a HANDOVER REQUEST ACKNOWLEDGE message from a target MN. In particular embodiments, the message from the target MN may contain an RRC reconfiguration message (e.g. RRCReconfiguration) containing a reconfigurationWithSync with a request to handover to the target MN, including CPC and/or CPA configuration(s) indicating the UE to keep, modify and/or release CPC and/or CPA configuration(s).

Certain other embodiments include methods and systems in a network node operating as a source SN for a UE configured with MR-DC and configured with conditional reconfiguration such as, for example, Conditional PSCell Addition/Change—CPAC execution.

According to certain embodiments, the method may include receiving a message from a Target MN. In particular embodiments, the message may include any of the following messages: a S-NODE ADDITION/MODIFICATION REQUEST in NR; a SENB ADDITION/MODIFICATION REQUEST messages in LTE; and a SGNB ADDITION/MODIFICATION REQUEST messages in EN-DC.

In particular embodiments, the message may include the UE context ID at the SN. Upon receiving the message, the Source SN may identify that the UE is configured with CPC and/or CPA and, when creating the SN's configuration to be provided to the target MN and forwarded to the source MN, the source SN may include configurations for the UE to add, releases, or modifies CPC and/or CPA configurations at the UE such as, for example, in an RRC Reconfiguration that is included in another message such as, for example, a response message that is transmitted to the target MN.

In particular embodiments, the message may include the CG-ConfigInfo containing the UEs CPAC configurations in source SN. Upon receiving the message, the Source SN may identify that the UE is configured with CPC and/or CPA and, when creating the SN's configuration to be provided to the target MN and forwarded to the source MN, the source SN may include configurations for the UE to add, releases, or modifies CPC and/or CPA configurations at the UE such as, for example, in an RRC Reconfiguration that is included in another message such as, for example, aa response message that is transmitted to the target MN.

According to certain embodiments, the method further includes transmitting a message to the Target MN. The message may include an RRC Reconfiguration including indications to remove, add, or modify CPA and/or CPC configuration(s). In particular embodiments, the message may include any of the following messages: a S-NODE ADDITION/MODIFICATION REQUEST in NR; a SENB ADDITION/MODIFICATION REQUEST messages in LTE; and a SGNB ADDITION/MODIFICATION REQUEST messages in EN-DC.

In particular embodiments, the message may include an indication that the SN is kept, an indication that the CPC is kept, and/or an indication that the CPA is kept.

Figure 1:
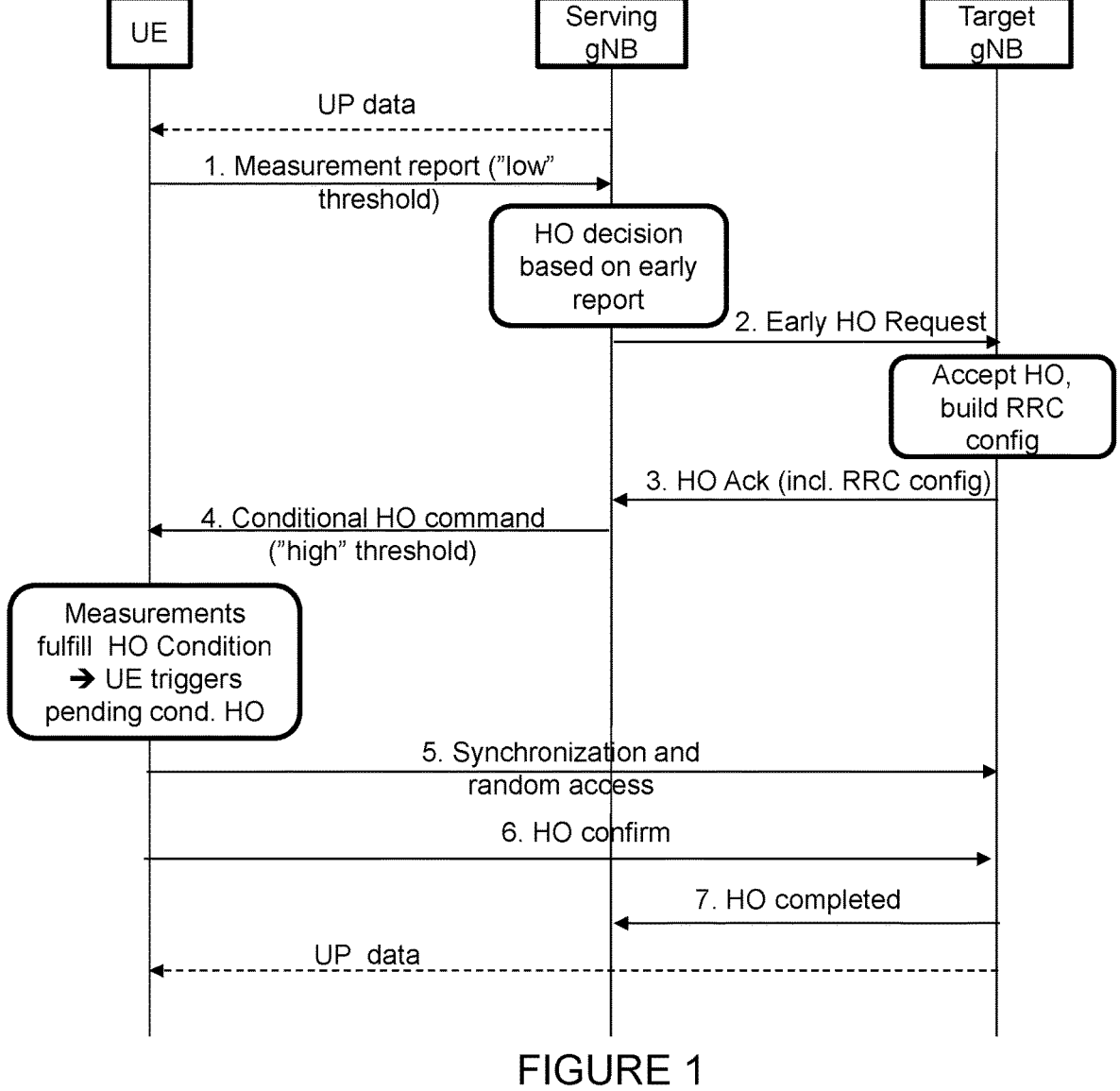
FIG. 1 illustrates a serving and a target cell.
Figure 2:
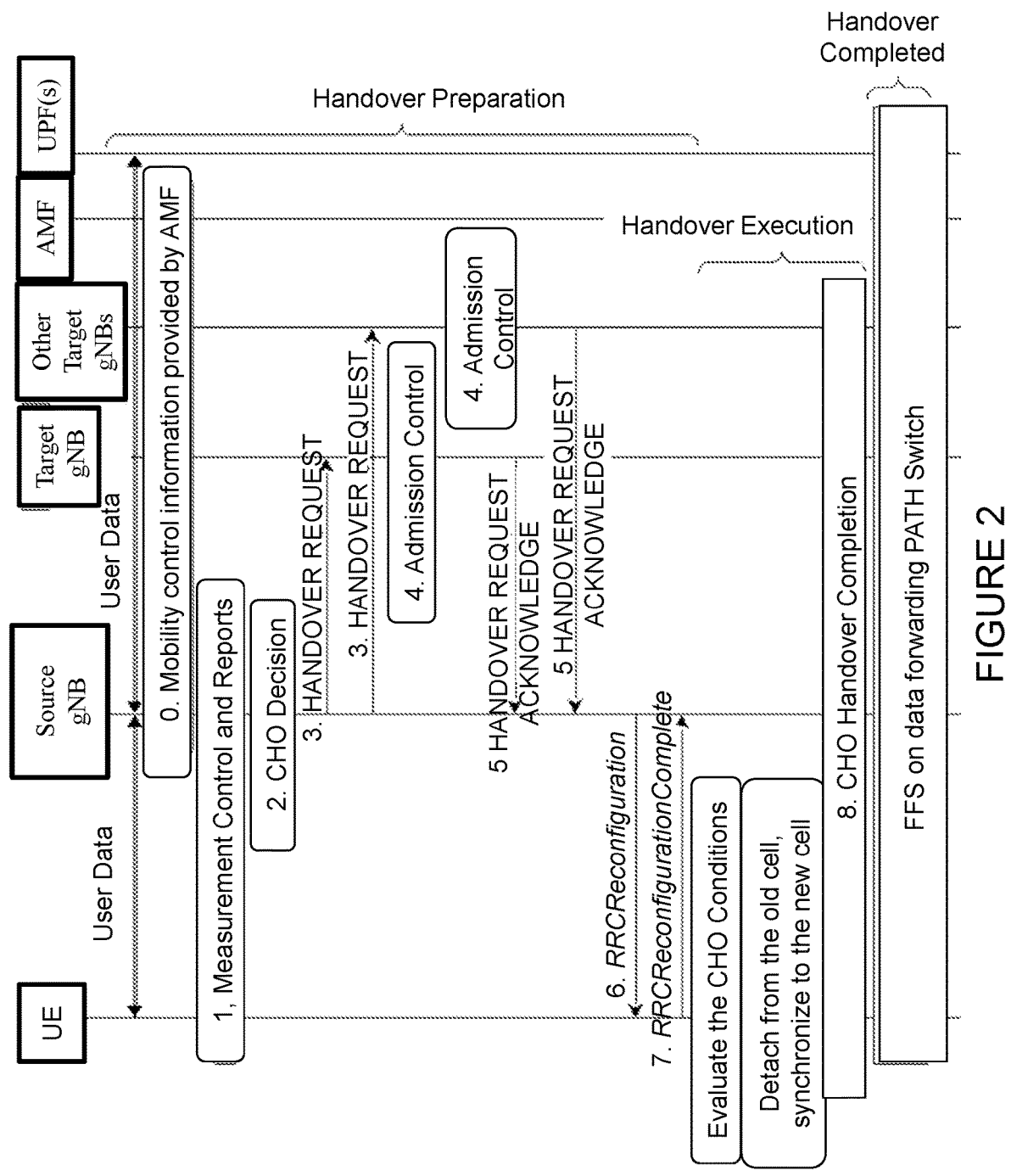
FIG. 2 illustrates the basic Intra-Access and Mobility Management Function (AMF)/User Plane Function (UPF) Conditional Handover scenario where neither the AMF nor the UPF changes.
Figure 3:
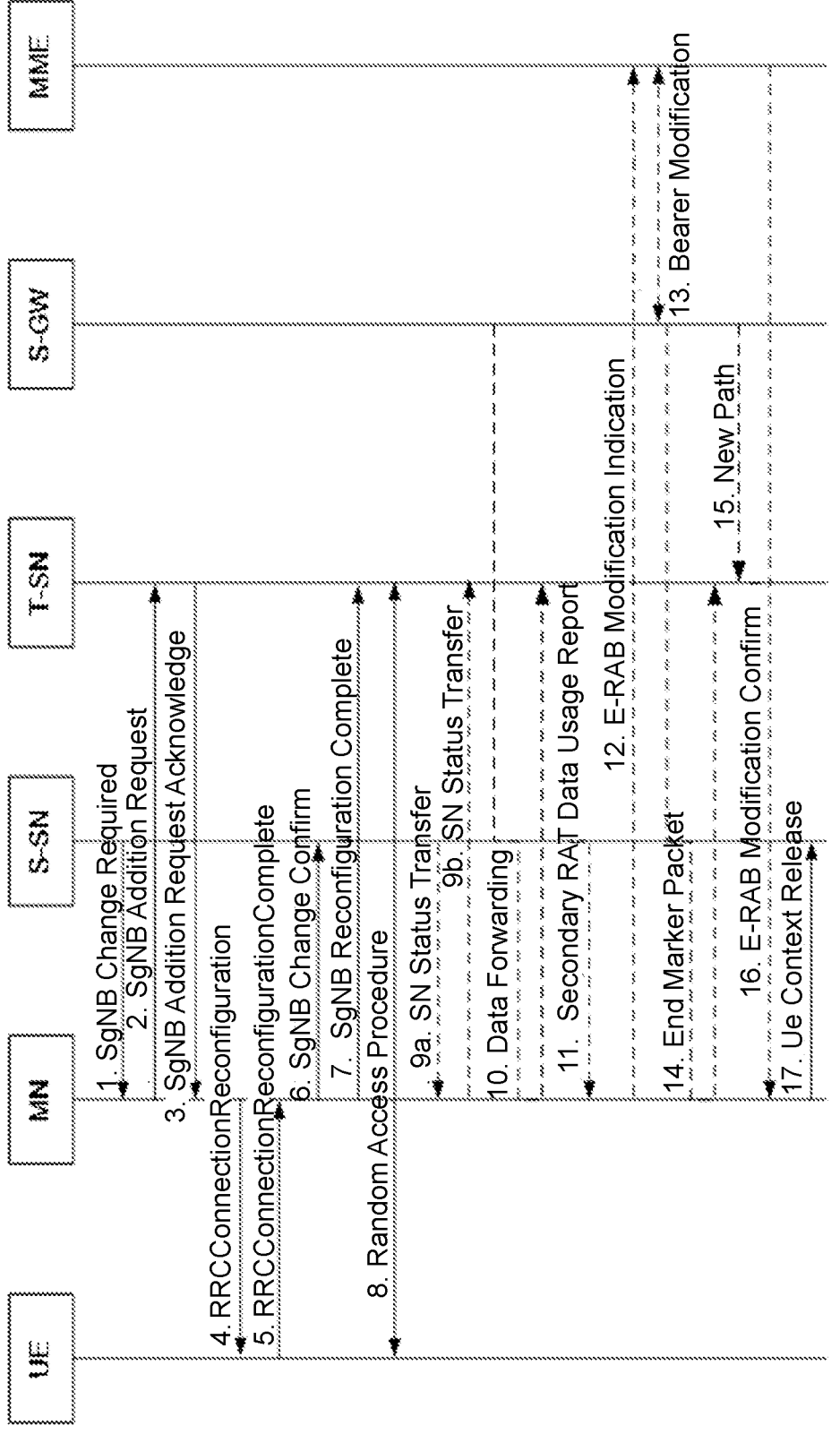
FIG. 3 illustrates an example signaling flow for the secondary node change initiated by the secondary node (SN)
Figure 4:
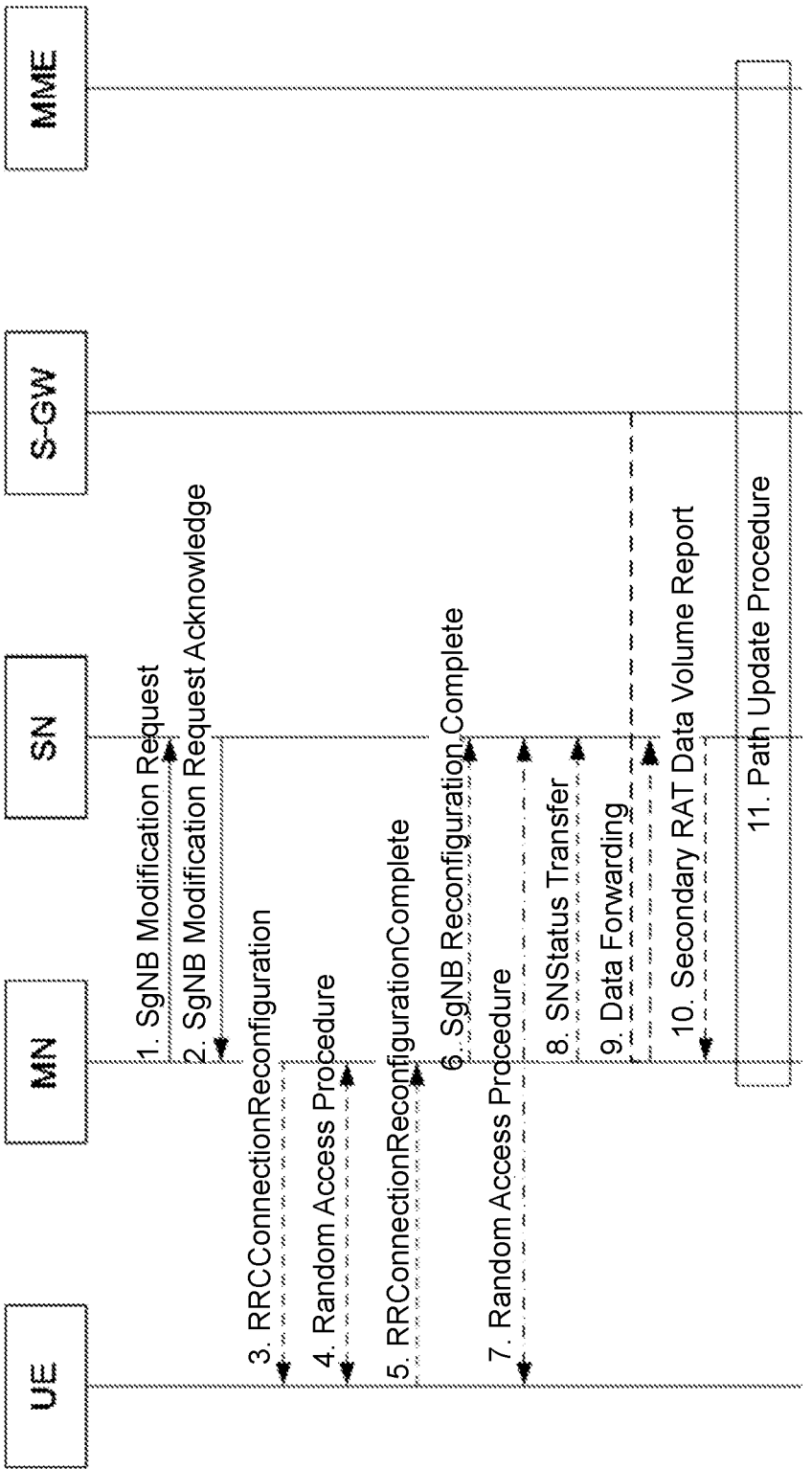
FIG. 4 illustrates a SN Modification procedure as initiated by the master node (MN)

Particular embodiments relate to the case where the PSCell in the SN is changed, and even more specifically a conditional PSCell Change (CPC). In Rel-16, only the intra-SN case without MN involvement for CPC is supported (i.e. where S-SN and T-SN are in same node such as depicted in FIG. 3. That means that the cell is changed, but both the old and the new cell are in the same node. On the other hand, the embodiments described herein are not limited to this case and may additionally relate inter-SN change based on CPC.

Although particular embodiments and examples refer to a CPC and/or CPA and/or CPAC configuration and procedures (like CPAC execution), other terms may be considered as synonyms such as conditional reconfiguration, or Conditional Configuration (since the message that is stored and applied upon fulfillment of a condition is an RRCReconfiguration or RRCConnectionReconfiguration). Conditional handover (CHO) may be interpreted in a broader sense, also covering CPC (Conditional PSCell Change) or CPAC (Conditional PSCell Addition/Change) procedures.

The term MN change is used when describing particular embodiments and examples, but the terms handover, reconfigurationWithSync, and PSCell change may also be used in the same context.

Currently, CPC is configured using the same Information Elements (IEs) as conditional handover, which may also be referred to as conditional configuration or conditional reconfiguration. The principle for the configuration is the same with configuring triggering/execution condition(s) and a reconfiguration message to be applied when the triggering condition(s) are fulfilled. The configuration IEs from TS 38.331 include the following.

The IE ConditionalReconfiguration is used to add, modify and release the configuration of conditional configuration and is shown below:

| ConditionalReconfiguration information element |
| --- |
| -- ASN1START |
| -- TAG-CONDITIONALRECONFIGURATION-START |
| ConditionalReconfiguration-r16 ::=     SEQUENCE { |
|    attemptCcondReconfig-r16     ENUMERATED {true} |
| OPTIONAL, -- Need N |
|    condConfigToRemoveList-r16     CondConfigToRemoveList-r16 |
| OPTIONAL, -- Need N |
|    condConfigToAddModList-r16     CondConfigToAddModList-r16 |
| OPTIONAL, -- Need N |
|    ... |
| } |
| CondConfigToRemoveList-r16 ::=     SEQUENCE (SIZE (1.. |
| maxNrofCondCells)) OF CondConfigId-r16 |
| -- TAG-CONDITIONALRECONFIGURATION-STOP |
| -- ASN1STOP |

| ConditionalReconfiguration field descriptions |
| --- |
| condConfigToAddModList |
| List of the configuration of candidate SpCells to be added or modified for CHO or CPC. |
| condConfigToRemoveList |
| List of the configuration of candidate SpCells to be removed. When the network removes the stored conditional configuration for a candidate cell, the network releases the measIDs associated to the condExecutionCond if it is not used by the condExecutionCond of other candidate cells. |

The IE CondConfigId is used to identify a CHO or CPC configuration and is shown below:

| CondConfigId information element |
| --- |
| -- ASN1START |
| -- TAG-CONDCONFIGID-START |
| CondConfigId-r16 ::=     INTEGER (1..maxNrofCond-Cells) |
| -- TAG-CONDCONFIGID-STOP |
| -- ASN1STOP |

The IE CHO-ConfigToAddModList concerns a list of conditional configurations to add or modify, with for each entry the cho-ConfigId and the associated condExecutionCond and condRRCReconfig:

| CondConfigToAddModList information element |
| --- |
| -- ASN1START |
| -- TAG-CONDCONFIGTOADDMODLIST-START |
| CondConfigToAddModList-r16 ::=     SEQUENCE (SIZE (1.. |
| maxNrofCondCells)) OF CondConfigToAddMod-r16 |
| CondConfigToAddMod-r16 ::=     SEQUENCE { |
|    condConfigId-r16     CondConfigId-r16, |
|    condExecutionCond-r16     SEQUENCE (SIZE (1..2)) OF |
| MeasId OPTIONAL, -- Need S |
|    condRRCReconfig-r16     OCTET STRING (CONTAINING |
| RRCReconfiguration) OPTIONAL,     -- Need S |
|    ... |
| } |
| -- TAG-CONDCONFIGTOADDMODLIST STOP |
| -- ASN1STOP |

| CondConfigToAddMod field descriptions |
| --- |
| condExecutionCond<br>The execution condition that needs to be fulfilled in order to trigger the execution of a<br>conditional configuration. The field is mandatory present when a condConfigId is being<br>added. Otherwise, when the condRRCReconfig associated to a condConfigId is being<br>modified it is optionally present and the UE uses the stored value if the field is absent.<br>condRRCReconfig<br>The RRCReconfiguration message to be applied when the condition(s) are fulfilled. The<br>field is mandatory present when a condConfigId is being added. Otherwise, when the<br>condExecutionCond associated to a condConfigId is being modified it is optionally present<br>and the UE uses the stored value if the field is absent. |

In existing specifications, only part of the source SN configuration can be transferred to the source MN and onwards to the target MN. The configuration that can be transferred is the configuration of the cell group (CellGroup-Config) and the measurement configuration. If the UE is allowed to keep the CPAC configurations at MN change, the CPAC configurations also need to be transferred to the new MN. That can be done by extending the inter-node RRC messages to include also the CPAC configurations.

In some embodiments, the source MN requests the source SN for the CPAC configurations (e.g. CPC configurations, CPA configurations, measurement configurations related to CPC, measurement configurations related to CPA, etc.). That can be done by initiating the procedure MN initiated SN modification as described in Chapter 10.3 in 3GPP TS 37.340. The source SN configuration is requested in the message SN MODIFICATION REQUEST which includes the CG Configuration Query IE. The response from the source SN contains the CPAC configurations. This may be done e.g. by updating the existing inter-node RRC message CG-Config which is included in SN MODIFICATION REQUEST ACKNOWLEDGE with a new field and/or new IE which could be a list of conditional reconfigurations and/or a list of CPC configurations and/or a list of CPA configurations, e.g. condConfigToAddModList of IE Cond-ConfigToAddModList.

Another option for some embodiments is to update SN MODIFICATION REQUEST ACKNOWLEDGE with a new container consisting of the CPAC or conditional configurations. An alternative solution is that the MN requests CPC and/or CPA configurations specifically by, for example, using a special IE included in the modification request message like CPC Configuration Query IE, CPA Configuration Query IE, etc.

In the next step, in some embodiments, the source MN forwards the source SN configuration to the target MN. That may be done in the Xn message HANDOVER REQUEST which contains the inter-node RRC message Handover-PreparationInformation. The HandoverPreparationInformation is updated to include also the source SN CPAC/conditional configurations.

The target MN may forward the source SN configuration to the target SN in SN ADDITION REQUEST or SN MODIFICATION REQUEST. The messages are updated to include CPAC/conditional configurations and that may be done in the existing inter-node RRC message CG-Config-Info or in a new container.

Figure 6:
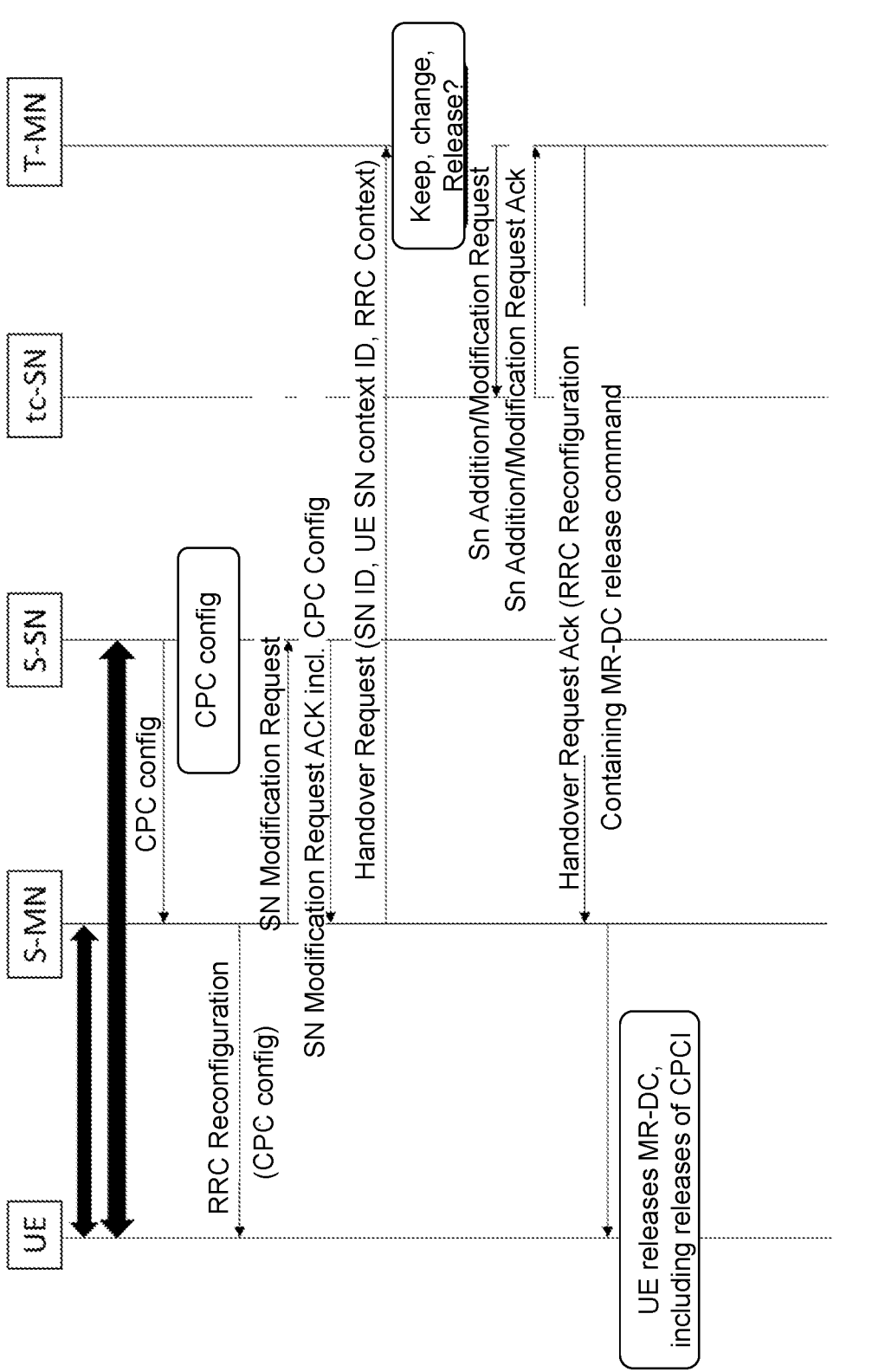
FIG. 6 illustrates another example signaling diagram for signaling between a UE, master SN, and a target node for providing the UE's current SN configuration and conditional reconfiguration, according to certain embodiments.

FIG. 6 illustrates a signalling diagram that includes CPAC configurations being transferred to the new MN in handover preparation procedure.

CPAC configuration may be added as part of UE context. For example, the CPAC configurations (or any conditional configurations) may be forwarded from the source MN to the target MN as part of the current SN configuration (the SN context). The following are example Inter-node RRC messages:

The HandoverPreparationInformation message is used to transfer the NR RRC information used by the target gNB during handover preparation or UE context retrieval, e.g. in case of resume or re-establishment, including UE capability information. This message is also used for transferring the information between the Central Unit (CU) and Distributed Unit (DU). The source gNB/source RAN sends the message to the target gNB or CU to DU.

| HandoverPreparationInformation message |
| --- |
| -- ASN1START<br>-- TAG-HANDOVER-PREPARATION-INFORMATION-START<br>HandoverPreparationInformation ::=    SEQUENCE {<br>    criticalExtensions           CHOICE {<br>        c1                    CHOICE{<br>           handoverPreparationInformation    HandoverPreparationInformation-IEs,<br>           spare3 NULL, spare2 NULL, spare1 NULL<br>        },<br>        criticalExtensionsFuture    SEQUENCE { }<br>    }<br>}<br>HandoverPreparationInformation-IEs ::=       SEQUENCE {<br>    ue-CapabilityRAT-List                       UE-CapabilityRAT-ContainerList,<br>    sourceConfig                    AS-Config        OPTIONAL, --<br>Cond HO<br>    rrm-Config                      RRM-Config           OPTIONAL,<br>    as-Context                      AS-Context          OPTIONAL,<br>    nonCriticalExtension               SEQUENCE { }<br>    OPTIONAL<br>}<br>AS-Config ::=          SEQUENCE { |

-continued

| HandoverPreparationInformation message |
|---|

```
    rrcReconfiguration        OCTET STRING (CONTAINING
RRCReconfiguration),
    ...,
    [[
    sourceRB-SN-Config        OCTET STRING (CONTAINING
RadioBearerConfig)    OPTIONAL,
    sourceSCG-NR-Config       OCTET STRING (CONTAINING
RRCReconfiguration)    OPTIONAL,
    sourceSCG-EUTRA-Config        OCTET STRING
OPTIONAL
    ]],
    [[
    sourceSCG-Configured        ENUMERATED {true}
OPTIONAL
    ]]
}
. . .
}
-- TAG-HANDOVER-PREPARATION-INFORMATION-STOP
-- ASN1STOP
```

| HandoverPreparationInformation field descriptions |
|---|

...
sourceSCG-NR-Config
Contains the current dedicated SCG configuration in RRCReconfiguration message as
generated entirely by the SN. In this version of the specification, the RRCReconfiguration
message can only include fields secondaryCellGroup, conditionalReconfiguration and
measConfig. This field is only used in NR-DC.

The CG-Config message is used to transfer the SCG radio configuration as generated by the SgNB or SeNB. It can also be used by a CU to request a DU to perform certain actions, e.g. to request the DU to perform a new lower layer configuration. The Secondary gNodeB (gNB) or eNodeB (eNB) transmits the message to the master gNB or eNB, alternatively CU to DU.

| CG-Config message |
|---|

```
-- ASN1START
-- TAG-CG-CONFIG-START
CG-Config ::=        SEQUENCE {
    criticalExtensions        CHOICE {
        c1                CHOICE{
            cg-Config                CG-Config-IEs,
            spare3 NULL, spare2 NULL, spare1 NULL
        },
        criticalExtensionsFuture        SEQUENCE { }
    }
}
CG-Config-IEs ::=        SEQUENCE {
    scg-CellGroupConfig        OCTET STRING (CONTAINING
```

-continued

| CG-Config message |
|---|

```
RRCReconfiguration)    OPTIONAL,
    scg-RB-Config                OCTET STRING (CONTAINING
RadioBearerConfig)    OPTIONAL,
    configRestrictModReq        ConfigRestrictModReqSCG
OPTIONAL,
    drx-InfoSCG                DRX-Info                OPTIONAL,
    candidateCellInfoListSN    OCTET STRING (CONTAINING
MeasResultList2NR) OPTIONAL,
    measConfigSN                MeasConfigSN                OPTIONAL,
    selectedBandCombination    BandCombinationInfoSN
OPTIONAL,
    fr-InfoListSCG                FR-InfoList                OPTIONAL,
    candidateServingFreqListNR    CandidateServingFreqListNR
OPTIONAL,
    nonCriticalExtension        CG-Config-v1540-IEs
OPTIONAL
}
-- TAG-CG-CONFIG-STOP
-- ASN1STOP
```

| scg-CellGroupConfig |
|---|

Contains the RRCReconfiguration message (containing only secondaryCellGroup,
conditionalReconfiguration and/or measConfig):
  - to be sent to the UE, used upon SCG establishment or modification, as generated
    (entirely) by the (target) SgNB. In this case, the SN sets the RRCReconfiguration
    message in accordance with clause 6 e.g. regarding the "Need" or "Cond" statements.
    or
  - including the current SCG configuration of the UE, when provided in response to a
    query from MN, or in SN triggered SN change in order to enable delta signaling by
    the target SN. In this case, the SN sets the RRCReconfiguration message in
    accordance with clause 11.2.3.

-continued

| scg-CellGroupConfig |
|---|
| The field is absent if neither SCG (re)configuration nor SCG configuration query nor SN triggered SN change is performed, e.g. at inter-node capability/configuration coordination which does not result in SCG (re)configuration towards the UE. This field is not applicable in NE-DC. |

The CG-ConfigInfo message is used by master eNB or gNB to request the SgNB or SeNB to perform certain actions e.g. to establish, modify or release an SCG. The message may include additional information e.g. to assist the SgNB or SeNB to set the SCG configuration. It can also be used by a CU to request a DU to perform certain actions, e.g. to establish, or modify an MCG or SCG. The Master eNB or gNB transmits the message to the secondary gNB or eNB, alternatively CU to DU.

```
                              CG-ConfigInfo message

-- ASN1START
-- TAG-CG-CONFIG-INFO-START
CG-ConfigInfo ::=     SEQUENCE {
    criticalExtension    CHOICE {
        c1              CHOICE {
            cg-ConfigInfo        CG-ConfigInfo-IEs,
            spare3 NULL, spare2 NULL, spare1 NULL
        },
        criticalExtensionsFuture    SEQUENCE { }
    }
}
CG-ConfigInfo-IEs ::=    SEQUENCE {
ue-CapabilityInfo          OCTET STRING (CONTAINING UE-CapabilityRAT-
ContainerList    OPTIONAL,--Cond SN-AddMod
    candidateCellInfoListMN                  MeasResultList2NR
OPTIONAL,
    candidateCellInfoListSN                       OCTET STRING (CONTAINING
MeasResultList2NR)                                OPTIONAL,
    measResultCellListSFTD-NR                        MeasResultCellListSFTD-NR
OPTIONAL,
    scgFailureInfo                    SEQUENCE {
        failureType                   ENUMERATED { t310-Expiry,
randomAccessProblem,                 rlc-MaxNumRetx, synchReconfigFailure-SCG,
                                     scg-reconfigFailure,
                                     srb3-IntegrityFailure},
        measResultSCG                 OCTET STRING (CONTAINING
MeasResultSCG-Failure)
    }                                                       OPTIONAL,
    configRestrictInfo            ConfigRestrictInfoSCG
OPTIONAL,
    drx-InfoMCG                   DRX-Info
OPTIONAL,
    measConfigMN                     MeasConfigMN
OPTIONAL,
    sourceConfigSCG                  OCTET STRING (CONTAINING
RRCReconfiguration)                          OPTIONAL,
    scg-RB-Config                 OCTET STRING (CONTAINING RadioBearerConfig)
OPTIONAL,
    mcg-RB-Config                 OCTET STRING (CONTAINING
RadioBearerConfig)                          OPTIONAL,
    mrdc-AssistanceInfo              MRDC-AssistanceInfo
OPTIONAL,
    nonCriticalExtension             CG-ConfigInfo-v1540-IEs
OPTIONAL
}
CG-ConfigInfo-v1540-IEs ::=              SEQUENCE {
    ph-InfoMCG                   PH-TypeListMCG
OPTIONAL,
    measResultReportCGI                   SEQUENCE {
        ssbFrequency                     ARFCN-ValueNR,
        cellForWhichToReportCGI                   PhysCellId,
        cgi-Info                 CGI-InfoNR
    }                                                       OPTIONAL,
    nonCriticalExtension             CG-ConfigInfo-v1560-IEs
OPTIONAL
}
CG-ConfigInfo-v1560-IEs ::=              SEQUENCE {
    candidateCellInfoListMN-EUTRA                     OCTET STRING
OPTIONAL,
    candidateCellInfoListSN-EUTRA                     OCTET STRING
```

-continued

| CG-ConfigInfo message |
|---|

```
OPTIONAL,
   sourceConfigSCG-EUTRA                           OCTET STRING
OPTIONAL,
   scgFailureInfoEUTRA                         SEQUENCE {
      failureTypeEUTRA                            ENUMERATED { t313-Expiry,
randomAccessProblem, rlc-MaxNumRetx, scgChangeFailure},
      measResultSCG-EUTRA                            OCTET STRING
   }                                                       OPTIONAL,
   drx-ConfigMCG                    DRX-CONFIG
OPTIONAL,
   measResultReportCGI-EUTRA                              SEQUENCE {
      eutraFrequency                       ARFCN-ValueEUTRA,
      cellForWhichToReportCGI-EUTRA                        EUTRA-PhysCellId,
      cgi-InfoEUTRA                           CGI-InfoEUTRA
   }                                                     OPTIONAL,
   measResultCellListSFTD-EUTRA                         MeasResultCellListSFTD-EUTRA
OPTIONAL,
   fr-InfoListMCG                   FR-InfoList
OPTIONAL,
   nonCriticalExtension             CG-ConfigInfo-v1570-IEs
OPTIONAL
}
CG-ConfigInfo-v1570-IEs ::=       SEQUENCE {
   sftdFrequencyList-NR                      SFTD-FrequencyList-EUTRA
OPTIONAL,
   nonCriticalExtension             CG-ConfigInfo-v1590-IEs
OPTIONAL
}
CG-ConfigINfo-v1590-IEs ::=       SEQUENCE {
   servFrequenciesMN-NR                     SEQUENCE (SIZE (1..maxNrofServingCells-1))
OF ARFCN-ValueNR OPTIONAL,
   nonCriticalExtension             CG-ConfigInfo-v16xy-IEs
OPTIONAL
}
CG-ConfigInfo-v16xy-IEs ::=       SEQUENCE {
   drx-InfoMCG2                     DRX-Info2
OPTIONAL,
   alignedDRX-Indication            ENUMERATED {true}
OPTIONAL,
   nonCriticalExtension             SEQUENCE { }
OPTIONAL
}
SFTD-FrequenceList-NR ::=                         SEQUENCE (SIZE (1..maxCellSFTD)) OF
ARFCN-ValueNR
SFTD-FrequenceList-EUTRA ::=                        SEQUENCE (SIZE (1..maxCellSFTD)) OF
ARFCN-ValueEUTRA
ConfigRestricInfoSCG ::=          SEQUENCE {
   allowedBC-ListMRDC                    BandCombinationInfoList
OPTIONAL,
   powerCoordination-FR1                    SEQUENCE {
      p-maxNR-FR1                    P-Max
OPTIONAL,
      p-maxEUTRA                     P-Max
OPTIONAL,
      p-maxUE-FR1                    P-Max                    OPTIONAL
   }                                             OPTIONAL,
   servCellIndexRangeSCG                 SEQUENCE {
      lowBound                    ServCellIndex,
      upBound                     ServCellIndex
   }                                             OPTIONAL, -- Cond
SN-AddMOd
   maxMeasFreqsSCG                          INTEGER(1..maxMeasFreqsMN)
OPTIONAL,
   dummy                         INTEGER(1..maxMeasIdentitiesMN)
OPTIONAL,
   ...,
   [[
   selectedBandEntriesMNList                      SEQUENCE (SIZE (1..maxBandComb)) OF
SelectedBandEntriesMN OPTIONAL,
   pdcch-BlindDetectionSCG                     INTEGER (1..15)
OPTIONAL,
   maxNumberROHC-ContextSessionsSN                      INTEGER (0.. 16384)
OPTIONAL
   ]],
   [[
   maxIntraFreqMeasIdentitiesSCG                      INTEGER(1..maxMeasIdentitiesMN)
```

-continued

| CG-ConfigInfo message |
|---|

```
OPTIONAL,
    maxInterFreqMeasIdentitiesSCG          INTEGER(1..maxMeasIdentitiesMN)
OPTIONAL
]],
[[
p-maxNR-FR1-MCG-r16                        P-Max
OPTIONAL,
    powerCoordination_FR2-r16              SEQUENCE {
        p-maxNR-FR2-MCG-r16                    P-Max
OPTIONAL,
        p-maxNR-FR2-SCG-r16                    P-Max
OPTIONAL,
        p-maxUE-FR2-r16                        P-Max
OPTIONAL
    }                                                                    OPTIONAL,
    nrdc-PC-mode-FR1-r16                   ENUMERATED {semi-static-mode1, semi-static-
mode2, dynamic}                            OPTIONAL,
    nrdc-PC-mode-FR2-r16                   ENUMERATED {semi-static-mode1, semi-static-
mode2, dynamic}                            OPTIONAL,
    maxMeasSRS-ResourceSCG-r16                        INTEGER(0..maxNrofSRS-Resources-r16
OPTIONAL,
    maxMeasCLI-ResourceSCG-r16                        INTEGER(0..maxNrofCLI-RSSI-Resources-
r16)            OPTIONAL
]]
}
SelectedBandEntriesMN ::=             SEQUENCE (SIZE (1..maxSimultaneousBands))
OF BandEntryIndex
BandEntryIndex ::=                   INTEGER (0.. maxNrofServingCells)
PH-TypeListMCG ::=                   SEQUENCE (SIZE (1..maxNrofServingCells)) OF
PH-InfoMCG
PH-InfoMCG ::=                       SEQUENCE {
    servCellIndex                        ServCellIndex,
    ph-Uplink                        PH-UplinkCarrierMCG,
    ph-SupplemntaryUplink                    PH-UplinkCarrierMCG
OPTIONAL,
    ...
}
PH-UplinkCarrierMCG ::=                   SEQUENCE{
    ph-Type1or3                      ENUMERATED (type1, type3),
    ...
}
BandCombinationInfoList ::=               SEQUENCE (SIZE (1..maxBandComb)) OF
BandCombinationInfo
BandCombinationInfo ::=               SEQUENCE {
    bandCombinationIndex                 BandCombinationIndex,
    allowedFeatureSetsList               SEQUENCE (SIZE (1..maxFeatureSetsPerBand))
OF FeatureSetEntryIndex
}
FeatureSetEntryIndex ::=                  INTEGER (1.. maxFeatureSetsPerBand)
DRX-Info ::=                     SEQUENCE {
    drx-LongCycleStartOffset                 CHOICE {
        ms10                     INTEGER(0..9),
        ms20                     INTEGER(0..19),
        ms32                     INTEGER(0..31),
        ms40                     INTEGER(0..39),
        ms60                     INTEGER(0..59),
        ms64                     INTEGER(0..63),
        ms70                     INTEGER(0..69),
        ms80                     INTEGER(0..79),
        ms128                    INTEGER(0..127),
        ms160                    INTEGER(0..159),
        ms256                    INTEGER(0..255),
        ms320                    INTEGER(0..319),
        ms512                    INTEGER(0..511),
        ms640                    INTEGER(0..639),
        ms1024                   INTEGER(0..1023),
        ms1280                   INTEGER(0..1279),
        ms2048                   INTEGER(0..2047),
        ms2560                   INTEGER(0..2559),
        ms5120                   INTEGER(0..5119),
        ms10240                      INTEGER(0..10239),
    },
    shortDRX                     SEQUENCE {
        drx-ShortCycle                   ENUMERATED {
                                 ms2, ms3, ms4, ms5, ms6, ms7, ms8, ms10, ms14,
ms16, ms20, ms30, ms32 ms35, ms40, ms64, ms80, ms128, ms160, ms256,
```

-continued

| CG-ConfigInfo message |
|---|

```
ms320, ms512, ms640, spare9,
                              spare8, spare7, spare6, spare5, spare4, spare3, spare2,
spare1 },
    drx-ShortCycleTimer             INTEGER (1..16)
    }                               OPTIONAL
}
DRX-Info2 ::=      SEQUENCE {
  drx-onDurationTimer   CHOICE {
          subMilliSeconds INTEGER (1..31),
          milliSeconds   ENUMERATED {
            ms1, ms2, ms3, ms4, ms5, ms6, ms8, ms10, ms20, ms30,
ms40, ms50, ms60,
                        ms80, ms100, ms200, ms300, ms400, ms500, ms600, ms800,
ms1000, ms1200,
                        ms1600, spare8, spare7, spare6, spare5, spare4, spare3, spare2,
spare1 }
              }
}
MeasConfigMN ::= SEQUENCE {
    measuredFrequenciesMN              SEQUENCE (SIZE (1..maxMeasFreqsMN))
OF NR-FreqInfo           OPTIONAL,
    measGapConfig              SetupRelease ( GapConfig }
OPTIONAL,
    gapPurpose                ENUMERATED {perUe, perFR1}
OPTIONAL,
    ...,
    [[ measGapConfigFR2              SetupRelease { GapConfig }
OPTIONAL
    ]]
}
MRDC-AssistanceInfo ::= SEQUENCE {
    affectedCarrierFreqCombInfoListMRDC      SEQUENCE (SIZE
(1..maxNrofCombIDC)) OF AffectedCarrierFreqCombInfoMRDC,
    ...
}
AffectedCarrierFreqCombInfoMRDC ::= SEQUENCE {
    victimSystemType                 VictimSytemType,
    interferenceDirectionMRDC              ENUMERATED {eutra-nr, nr, other, utra-nr-
other, nr-other, spare3, spare2, spare1},
    affectedCarrierFreqCombMRDC              SEQUENCE   {
        affectedCarrierFreqCombEUTRA          AffectedCarrierFreqCombEUTRA
OPTIONAL,
        affectedCarrierFreqCombNR              AffectedCarrierFreqCombNR
    }     OPTIONAL
}
VictimSystemType ::= SEQUENCE {
    gps             ENUMERATED {true}                   OPTIONAL,
    glonass               ENUMERATED {true}                   OPTIONAL,
    bds             ENUMERATED {true}                   OPTIONAL,
    galileo             ENUMERATED {true}                   OPTIONAL,
    wlan             ENUMERATED {true}                   OPTIONAL,
    bluetooth             ENUMERATED {true}                   OPTIONAL,
}
AffectedCarrierFreqCombEUTRA ::= SEQUENCE (SIZE
(1..maxNrofServingCellsEUTRA)) OF ARFCN-ValueEUTRA
AffectedCarrierFreqCombNR ::= SEQUENCE (SIZE (1..maxNrofServingCells)) OF
ARFCN-ValueNR
-- TAG-CG-CONFIG-INFO-STOP
-- ASN1STOP
```

| CG-ConfigInfo field descriptions |
|---| sourceConfigSCG
Includes all of the current SCG configurations used by the target SN to build delta
configuration to be sent to UE, e.g. during SN change. The field contains the
RRCReconfiguration message, i.e. including secondaryCellGroup,
conditionalReconfiguration and measConfig. The field is signaled upon change of SN,
unless MN uses full configuration option. Otherwise, the field is absent.
sourceConfigSCG-EUTRA
Includes the E-UTRA RRCConnectionReconfiguration message as specified in TS 36.331.
In this version of the specification, the E-UTRA RRC message can only include the field
scg-Configuration. In this version of the specification, this field is absent when master gNB
uses full configuration option. This field is only used in NE-DC.
ue-CapabilityInfo -continued

| CG-ConfigInfo field descriptions |
| --- |
| Contains the IE UE-CapabilityRAT-ContainerList supported by the UE. A gNB that retrieves MRDC related capability containers ensures that the set of included MRDC containers is consistent with respect to the feature set related information. |

For the AS-Config transferred within the HandoverPreparationInformation, the source node shall include all fields necessary to reflect the AS configuration of the UE, except for the fields sourceSCG-NR-Config, sourceSCG-EUTRA-Config and sourceRB-SN-Config, which can be omitted in case the source MN did not receive the latest configuration from the source SN. For RRCReconfiguration included in the field rrcReconfiguration, ReconfigurationWithSync is included with only the mandatory subfields (e.g. newUE-Identity and t304) and ServingCellConfigCommon. 'Need codes or conditions specified for subfields according to IEs' as defined in clause 6 do not apply. For example, some fields shall be included regardless of the "Need" or "Cond" e.g. discardTimer. Based on the received AS configuration, the target node can indicate the delta (difference) to the UE's AS configuration (as included in HandoverCommand). The fields newUE-Identity and t304 included in ReconfigurationWithSync are not used for delta configuration purpose.

The candidateCellInfoListSN(-EUTRA) in CG-Config and the candidateCellInfoListMN(-EUTRA)/candidateCellInfoListSN(-EUTRA) in CG-ConfigInfo need not be included in procedures that do not involve a change of node.

For a field that conveys the UE configuration in CG-Config (SN initiated change of SN configuration, or SCG configuration query) and in CG-ConfigInfo upon change of SN (i.e. mcg-RB-Config, scg-RB-Config and sourceConfigSCG), the source node may include all fields necessary to reflect the AS configuration of the UE, unless stated otherwise in the field description. For RRCReconfiguration included in the field scg-CellGroupConfig in CG-Config, ReconfigurationWithSync is included with only the mandatory subfields (e.g. newUE-Identity and t304) and ServingCellConfigCommon. 'Need codes or conditions specified for subfields according to IEs' as defined in clause 6 do not apply. Based on the received AS configuration, the target node may indicate the delta (difference) to the UE's AS configuration (as included in CG-Config). The fields newUE-Identity and t304 included in ReconfigurationWithSync may not be used for delta configuration purpose.

For the other fields in CG-Config and CG-ConfigInfo, the sender may always signal the appropriate value even if same as indicated in the previous RRC INM, unless explicitly stated otherwise. As an exception to this general rule, the absence of the below listed fields means that the receiver maintains the values informed via the previous message. Note that every time there is a change in the configuration covered by a listed field, the MN shall include the field and it shall provide the full configuration provided by that field. Otherwise, if there is no change, the field can be omitted:
    configRestrictInfo;
    gapPurpose;
    measGapConfig (for which delta signaling applies);
    measGapConfigFR2 (for which delta signaling applies);
    measResultCellListSFTD;
    measResultSFTD-EUTRA;
    sftdFrequencyList-EUTRA;
    sftdFrequencyList-NR;
    ue-CapabilityInfo.

According to certain other embodiments, the restriction on what is included in RRCReconfiguration containing the SN configuration may be removed completely. This may make it possible to additionally include the conditional reconfigurations in the SN context.

The HandoverPreparationInformation message may include the sourceSCG-NR-Config that contains the current dedicated SCG configuration in RRCReconfiguration message as generated entirely by the SN. This field may only be used in NR-DC.

The CG-Config message includes the scg-CellGroupConfig that contains the RRCReconfiguration message to be sent to the UE. The scg-CellGroupConfig is used upon SCG establishment or modification, as generated (entirely) by the (target) SgNB. In this case, the SN sets the RRCReconfiguration message in accordance with Clause 6 such as, for example, regarding the "Need" or "Cond" statements. Alternatively, the SN includes the current SCG configuration of the UE, when provided in response to a query from MN, or in SN triggered SN change in order to enable delta signaling by the target SN. In this case, the SN sets the RRCReconfiguration message in accordance with Clause 11.2.3 of 3GPP TS 38.331.

The field is absent if neither SCG (re)configuration nor SCG configuration query nor SN triggered SN change is performed such as, for example, at inter-node capability/configuration coordination which does not result in SCG (re)configuration towards the UE. This field may not be applicable in NE-DC.

The CG-ConfigInfo message includes the sourceConfigSCG, which includes all of the current SCG configurations used by the target SN to build delta configuration to be sent to UE such as, for example, during SN change. The field contains the RRCReconfiguration message. The field is signaled upon change of SN, unless MN uses full configuration option. Otherwise, the field may be absent.

Figure 7:
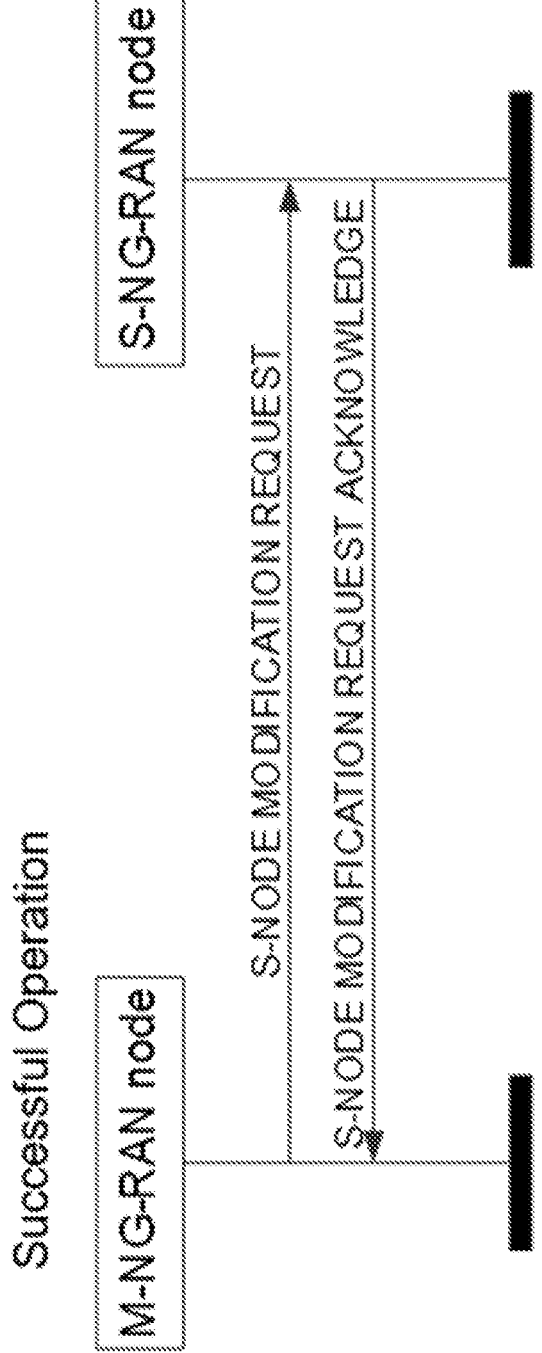
FIG. 7 illustrates an example of a possible implementation of a M-NG-RAN node initiated S-NG-RAN node Modification Preparation message, according to certain embodiments.

FIG. 7 illustrates an example of a possible implementation in 3GPP TS 38.423 of a M-NG-RAN node initiated S-NG-RAN node Modification Preparation message. This procedure is used to enable an M-NG-RAN node to request an S-NG-RAN node to either modify the UE context at the S-NG-RAN node or to query the current SCG configuration for supporting delta signaling in M-NG-RAN node initiated S-NG-RAN node change, or to provide the S-RLF-related information to the S-NG-RAN node. The procedure uses UE-associated signaling.

The M-NG-RAN node initiates the procedure by sending the S-NODE MODIFICATION REQUEST message to the S-NG-RAN node.

When the M-NG-RAN node sends the S-NODE MODIFICATION REQUEST message, the M-NG-RAN node shall start the timer $TXn_{DCprep}$.

The S-NODE MODIFICATION REQUEST message may contain:
    within the UE Context Information IE;
    PDU session resources to be added within the PDU
        Session Resources To Be Added Item IE;

PDU session resources to be modified within the PDU Session Resources To Be Modified Item IE;

PDU session resources to be released within the PDU Session Resources To Be Released Item IE;

the S-NG-RAN node Security Key IE;

the S-NG-RAN node UE Aggregate Maximum Bit Rate IE;

the M-NG-RAN node to S-NG-RAN node Container IE;

the PDCP Change Indication IE;

the SCG Configuration Query IE;

the Requested split SRBs IE;

the Requested split SRBs release IE;

the Requested fast MCG recovery via SRB3 IE;

the Requested fast MCG recovery via SRB3 Release IE;

the Additional DRB IDs IE;

the MR-DC Resource Coordination Information IE.

If the S-NODE MODIFICATION REQUEST message contains the Selected PLMN IE, the S-NG-RAN node may use it for RRM purposes.

If the S-NODE MODIFICATION REQUEST message contains the Mobility Restriction List IE, the S-NG-RAN node shall replace the previously provided Mobility Restriction List by the received Mobility Restriction List in the UE context and use this information to select an appropriate SCG.

If the S-NG-RAN node UE Aggregate Maximum Bit Rate IE is included in the S-NODE MODIFICATION REQUEST message, the S-NG-RAN node shall replace the previously provided S-NG-RAN node UE Aggregate Maximum Bit Rate by the received S-NG-RAN node UE Aggregate Maximum Bit Rate in the UE context and use the received S-NG-RAN node UE Aggregate Maximum Bit Rate for Non-GBR Bearers for the concerned UE as defined in 3GPP TS 37.340.

If the S-NODE MODIFICATION REQUEST message contains the Index to RAT/Frequency Selection Priority IE, the S-NG-RAN node may use it for RRM purposes.

If the S-NODE MODIFICATION REQUEST message contains the S-NG-RAN node PDU Session Aggregate Maximum Bit Rate IE, the S-NG-RAN node may use it for RRM purposes.

If the S-NODE MODIFICATION REQUEST message contains the MR-DC Resource Coordination Information IE, the S-NG-RAN node should forward it to lower layers, and it may use it for the purpose of resource coordination with the M-NG-RAN node. The S-NG-RAN node shall consider the value of the received UL Coordination Information IE valid until reception of a new update of the IE for the same UE. The S-NG-RAN node shall consider the value of the received DL Coordination Information IE valid until reception of a new update of the IE for the same UE. If the E-UTRA Coordination Assistance Information IE or the NR Coordination Assistance Information IE is contained in the MR-DC Resource Coordination Information IE, the S-NG-RAN node shall, if supported, use the information to determine further coordination of resource utilisation between the S-NG-RAN node and the M-NG-RAN node.

If the S-NODE MODIFICATION REQUEST message contains the NE-DC TDM Pattern IE, the S-NG-RAN node should forward it to lower layers and use it for the purpose of single uplink transmission. The S-NG-RAN node shall consider the value of the received NE-DC TDM Pattern IE valid until reception of a new update of the IE for the same UE.

The allocation of resources according to the values of the Allocation and Retention Priority IE included in the QoS Flow Level QoS Parameters IE for each QoS flow shall follow the principles specified for the PDU Session Resource Setup procedure in 3GPP TS 38.413.

If the Additional QoS Flow Information IE is included for a QoS flow in the S-NODE MODIFICATION REQUEST message, the S-NG-RAN node shall behave the same as the NG-RAN node in the PDU Session Resource Setup procedure, specified in 3GPP TS 38.413.

For each PDU session, if the Network Instance IE is included in the PDU Session Resource Setup Info—SN terminated IE and in the PDU Session Resource Modification Info—SN terminated IE and the Common Network Instance IE is not present, the S-NG-RAN node shall, if supported, use it when selecting transport network resource as specified in 3GPP TS 23.501.

For each PDU session, if the Common Network Instance IE is included in the PDU Session Resource Setup Info—SN terminated IE and in the PDU Session Resource Modification Info—SN terminated IE, the S-NG-RAN node shall, if supported, use it when selecting transport network resource as specified in 3GPP TS 23.501.

For each GBR QoS flow, if the Offered GBR QoS Flow Information IE is included in the QoS Flows To Be Setup List IE contained in the PDU Session Resource Setup Info—SN terminated IE, the S-NG-RAN node may request the M-NG-RAN node to configure the DRB to which that QoS flow is mapped with MCG resources.

For each PDU session, if the Non-GBR Resources Offered IE is included in the PDU Session Resource Modification Info—SN terminated IE contained in the PDU Session Resources To Be Added List IE and set to "true", the S-NG-RAN node may request the M-NG-RAN node to configure the DRBs to which non-GBR QoS flows of the PDU session are mapped with MCG resources.

If at least one of the requested modifications is admitted by the S-NG-RAN node, the S-NG-RAN node shall modify the related part of the UE context accordingly and send the S-NODE MODIFICATION REQUEST ACKNOWLEDGE message back to the M-NG-RAN node.

The M-NG-RAN node shall include RLC Mode IE for each bearer offloaded from M-NG-RAN node to S-NG-RAN node in the DRBs to QoS Flow Mapping List IE within the PDU Session Resource Setup Info—SN terminated IE of the S-NODE MODIFICATION REQUEST message, and the RLC Mode IE indicates the mode that the M-NG-RAN used for the DRB when it was hosted at the M-NG-RAN node.

The S-NG-RAN node shall include the PDU sessions for which resources have been either added or modified or released at the S-NG-RAN node either in the PDU Session Resources Admitted To Be Added List IE or the PDU Session Resources Admitted To Be Modified List IE or the PDU Session Resources Admitted To Be Released List IE. The S-NG-RAN node shall include the PDU sessions that have not been admitted in the PDU Session Resources Not Admitted List IE with an appropriate cause value.

If the M-NG-RAN node requests transfer of the PDCP hosting from the S-NG-RAN node to the M-NG-RAN node for a PDU session, in which case the S-NODE MODIFICATION REQUEST message contains an PDU session resource to be released which is configured with the SCG bearer option within the PDU Session Resources To Be Released List IE, the S-NG-RAN node shall include the RLC Mode IE within the DRBs To Be Released List IE in the PDU Session Resources admitted to be released List—SN terminated IE in the S-NODE MODIFICATION REQUEST ACKNOWLEDGE message. The RLC Mode IE indicates the RLC mode that the S-NG-RAN node uses for the DRB.

If the QoS Flow Mapping Indication IE is included in the S-NODE MODIFICATION REQUEST message for a QoS flow to be modified, the S-NG-RAN node may replace and take it into account that only the uplink or downlink QoS flow is mapped to the DRB.

If the S-NODE MODIFICATION REQUEST message contains for a PDU session resource to be modified which is configured with the SN terminated bearer option, the UL NG-U UP TNL Information at UPF IE the S-NG-RAN node shall use it as the new UL NG-U address.

If the S-NODE MODIFICATION REQUEST message contains for a PDU session resource to be modified which is configured with the MN terminated bearer option, the MN UL PDCP UP TNL Information IE the S-NG-RAN node shall use it as the new UL Xn-U address.

If the S-NODE MODIFICATION REQUEST message contains the QoS flows To Be Released List within the PDU Session Resource Modification Info—SN terminated IE, the S-NG-RAN node may propose to apply forwarding of UL data for the QoS flows for which in-order delivery is requested by including the UL Forwarding Proposal IE in the Data Forwarding and Offloading Info from source NG-RAN node IE within the PDU Session Resource Modification Response Info—SN terminated IE of the S-NODE MODIFICATION REQUEST ACKNOWLEDGE message.

For a PDU session resource to be modified which is configured with the SN terminated bearer option the S-NG-RAN node may include in the S-NODE MODIFICATION REQUEST ACKNOWLEDGE message the DL NG-U UP TNL Information at NG-RAN IE.

For a PDU session resource to be modified which is configured with the MN terminated bearer option the S-NG-RAN node may include in the S-NODE MODIFICATION REQUEST ACKNOWLEDGE message the SN DL SCG UP TNL Information IE.

If the PDCP Change Indication IE is included in the S-NODE MODIFICATION REQUEST message, the S-NG-RAN node shall act as specified in TS 37.340.

Upon reception of the S-NODE MODIFICATION REQUEST ACKNOWLEDGE message the M-NG-RAN node shall stop the timer $TXn_{DCprep}$. If the S-NODE MODIFICATION REQUEST ACKNOWLEDGE message has included the S-NG-RAN node to M-NG-RAN node Container IE, the M-NG-RAN node is then defined to have a Prepared S-NG-RAN node Modification for that Xn UE-associated signalling.

If the SCG Configuration Query IE is included in the S-NODE MODIFICATION REQUEST message, the S-NG-RAN node shall provide corresponding radio configuration information within the S-NG-RAN node to M-NG-RAN node Container IE, may provide the CPAC configuration if CPAC is configured in the UE in the S-NG-RAN node CPAC configuration Container IE and may provide the corresponding data forwarding related information within the PDU Session Resources with Data Forwarding List IE as specified in TS 37.340.

For each bearer for which allocation of the PDCP entity is requested at the S-NG-RAN node, if applicable, the M-NG-RAN node may propose to apply forwarding of downlink data by including the DL Forwarding IE within the PDU Session Resource Setup Info—SN terminated IE of the S-NODE MODIFICATION REQUEST message. For each bearer that it has decided to admit, the S-NG-RAN node may include the DL Forwarding GTP Tunnel Endpoint IE within the PDU Session Resource Setup Response Info—SN terminated IE of the S-NODE MODIFICATION REQUEST ACKNOWLEDGE message to indicate that it accepts the proposed forwarding of downlink data for this bearer. The S-NG-RAN node may include for each bearer in the PDU Session Resource Setup Response Info—SN terminated IE the UL Forwarding GTP Tunnel Endpoint IE to indicate it requests data forwarding of uplink packets to be performed for that bearer.

The M-NG-RAN node may propose to apply forwarding of UL data when offloading QoS flows for which in-order delivery is requested by including the UL Forwarding Proposal IE in the Data Forwarding and Offloading Info from source NG-RAN node IE within the PDU Session Resource Setup Info—SN terminated IE or PDU Session Resource Modification Info—SN terminated IE of the S-NODE MODIFICATION REQUEST message. The S-NG-RAN node may include the PDU Session Level UL Data Forwarding UP TNL Information IE in the Data Forwarding Info from target NG-RAN node IE within the PDU Session Resource Setup Response Info—SN terminated IE or PDU Session Resource Modification Response Info—SN terminated IE of the S-NODE MODIFICATION REQUEST ACKNOWLEDGE message to indicate that it accepts the proposed forwarding.

If the S-NODE MODIFICATION REQUEST message contains the Requested Split SRBs IE, the S-NG-RAN node may use it to add split SRBs. If the S-NODE MODIFICATION REQUEST message contains the Requested Split SRBs release IE, the S-NG-RAN node may use it to release split SRBs.

The M-NG-RAN node may request the S-NG-RAN node to configure the SRB3 by including the Requested Fast MCG recovery via SRB3 IE in the S-NODE MODIFICATION REQUEST message. The M-NG-RAN node may request the S-NG-RAN node to release the SRB3 by including the Requested Fast MCG recovery via SRB3 Release IE in the S-NODE MODIFICATION REQUEST message. The S-NG-RAN node may include the Available fast MCG recovery via SRB3 or the Release fast MCG recovery via SRB3 IE in the S-NODE MODIFICATION REQUEST ACKNOWLEDGE message to indicate that the SRB3 is enabled or released.

If the Lower Layer presence status change IE set to "release lower layers" is included in the S-NODE MODIFICATION REQUEST message, the S-NG-RAN node shall act as specified in 3GPP TS 37.34.

If the Lower Layer presence status change IE set to "re-establish lower layers" is included in the S-NODE MODIFICATION REQUEST message, the S-NG-RAN node shall act as specified in 3GPP TS 37.34.

If the Lower Layer presence status change IE set to "suspend lower layers" is included in the S-NODE MODIFICATION REQUEST message, the S-NG-RAN node shall act as specified in 3GPP TS 37.34.

If the Lower Layer presence status change IE set to "resume lower layers" is included in the S-NODE MODIFICATION REQUEST message, the S-NG-RAN node shall act as specified in 3GPP TS 37.34.

The M-NG-RAN node may include for each bearer in the DRBs To Be Modified List IE in the S-NODE MODIFICATION REQUEST message the RLC Status IE to indicate that RLC has been reestablished at the M-NG-RAN node and the S-NG-RAN node may trigger PDCP data recovery.

If the S-NODE MODIFICATION REQUEST message contains the PDCP SN Length IE in the DRBs To Be Setup List IE, the S-NG-RAN node shall, if supported, store this information and use it for lower layer configuration of the concerned MN terminated bearer.

If the PDCP Duplication Configuration IE in the PDU Session Resource Modification Info—MN terminated IE is contained in the S-NODE MODIFICATION REQUEST message and set to "configured", the S-NG-RAN node shall, if supported, add the RLC entity of secondary path for the indicated DRB. And if the S-NODE MODIFICATION REQUEST message contains the Duplication Activation IE, the S-NG-RAN node shall, if supported, store this information and use it for the purpose of PDCP duplication.

If the PDCP Duplication Configuration IE in the PDU Session Resource Modification Info—MN terminated IE is contained in the S-NODE MODIFICATION REQUEST message and set to "de-configured", the S-NG-RAN node shall, if supported, delete the RLC entity of secondary path for the indicated DRB.

The S-NG-RAN node may include for each bearer in the DRBs To Be Setup List IE in the S-NODE MODIFICATION REQUEST ACKNOWLEDGE message the PDCP SN Length IE to indicate the PDCP SN length for that DRB.

The S-NG-RAN node may include the QoS Flow Mapping Indication IE for a QoS flow in the S-NODE MODIFICATION REQUEST ACKNOWLEDGE message to indicate that only the uplink or downlink QoS flow is mapped to the DRB.

If the Additional DRB IDs IE is included in the S-NODE MODIFICATION REQUEST message, the S-NG-RAN node shall store this information and use it together with previously provided DRB IDs if any, for SN terminated bearers.

If the S-NODE MODIFICATION REQUEST message contains the S-NG-RAN node Maximum Integrity Protected Data Rate Uplink IE or the S-NG-RAN node Maximum Integrity Protected Data Rate Downlink IE, the S-NG-RAN node shall use the received information when enforcing the maximum integrity protected data rate for the UE.

If the Security Indication IE is included in the PDU Session Resource Setup Info—SN terminated IE of the S-NODE MODIFICATION REQUEST message, the behaviour of the S-NG-RAN node shall be the same as specified for the same IE in the PDU Session Resources To Be Setup List IE in the Handover Preparation procedure, for the concerned PDU session, and the S-NG-RAN node shall include the Security Result IE in the PDU Session Resource Setup Response Info—SN terminated IE.

If the Security Result IE is included in the PDU Session Resource Setup Info—SN terminated IE of the S-NODE MODIFICATION REQUEST message, the S-NG-RAN node may take the information into account when deciding whether to perform user plane integrity protection or ciphering for the DRBs that it establishes for the concerned PDU session, except if the Split Session Indicator IE is included in the PDU Session Resource Setup Info—SN terminated IE and set to "split", in which case it shall perform user plane integrity protection or ciphering according to the information in the Security Result IE. If the S-NG-RAN node is an ng-eNB, it shall reject all PDU sessions for which the Integrity Protection Indication IE is set to "required" as specified in 3GPP TS 33.501. If either the S-NG-RAN node or the M-NG-RAN node is an ng-eNB, the S-NG-RAN node shall behave according to clause 6.10.4 of 3GPP TS 33.501 for PDU sessions for which the Integrity Protection Indication IE is set to "preferred".

The S-NG-RAN node may include the Location Information at S-NODE IE in the S-NODE MODIFICATION REQUEST ACKNOWLEDGE message, if respective information is available at the S-NG-RAN node.

If the Location Information at S-NODE Reporting IE set to "pscell" is included in the S-NODE MODIFICATION REQUEST, the S-NG-RAN node shall start providing information about the current location of the UE. If the Location Information at S-NODE IE is included in the S-NODE MODIFICATION REQUEST ACKNOWLEDGE, the M-NG-RAN node shall store the included information so that it may be transferred towards the AMF.

If the S-NSSAI IE is included in the PDU Session Resources To Be Modified List IE in the S-NODE MODIFICATION REQUEST message, the S-NG-RAN node shall replace the previously S-NSSAI IE by the received S-NSSAI IE.

If the S-NODE MODIFICATION REQUEST ACKNOWLEDGE message contains the MR-DC Resource Coordination Information IE, the M-NG-RAN node may use it for the purpose of resource coordination with the S-NG-RAN node. The M-NG-RAN node shall consider the value of the received UL Coordination Information IE valid until reception of a new update of the IE for the same UE. The M-NG-RAN node shall consider the value of the received DL Coordination Information IE valid until reception of a new update of the IE for the same UE. If the E-UTRA Coordination Assistance Information IE or the NR Coordination Assistance Information IE is contained in the MR-DC Resource Coordination Information IE, the M-NG-RAN node shall, if supported, use the information to determine further coordination of resource utilisation between the M-NG-RAN node and the S-NG-RAN node.

If the S-NODE MODIFICATION REQUEST message contains the PCell ID IE, the S-NG-RAN node may search for the target cell among the neighbour cells of the PCell indicated, as specified in the 3GPP TS 37.34.

If the S-NG-RAN node applied a full configuration or delta configuration, e.g., as part of mobility procedure involving a change of DU, the S-NG-RAN node shall inform the M-NG-RAN node by including the RRC config indication IE in the S-NODE MODIFICATION REQUEST ACKNOWLEDGE message.

If the Default DRB Allowed IE is included in the PDU Session Resource Setup Info—SN terminated IE or PDU Session Resource Modification Info—SN terminated IE of the S-NODE MODIFICATION REQUEST message and set to "true", the S-NG-RAN node may configure the default DRB for the PDU session.

If the Default DRB Allowed IE is included in the PDU Session Resource Setup Info—SN terminated IE or PDU Session Resource Modification Info—SN terminated IE of the S-NODE MODIFICATION REQUEST message and set to "false", the S-NG-RAN node shall not configure the default DRB for the PDU session and the S-NG-RAN shall reconfigure the default DRB into a normal DRB if it has configured the default DRB before.

If the S-NODE MODIFICATION REQUEST ACKNOWLEDGE message includes the DRB IDs taken into use IE, the M-NG-RAN node, if applicable, shall act as specified in 3GPP TS 37.34.

If the QoS Monitoring Request IE is included in the QoS Flow Level QoS Parameters IE for a QoS flow contained in the DRBs To Be Setup List IE or the DRBs To Be Modified List IE within the PDU Session Resource Setup Info—MN terminated IE or the PDU Session Resource Modification Info—MN terminated IE, the S-NG-RAN node shall, if supported, use it to configure lower layers for the purpose of delay measurement and QoS monitoring as specified in 3GPP TS 23.501.

For each QoS flow which has been successfully added or modified in the S-NG-RAN node, if the QoS Monitoring Request IE was included in the QoS Flow Level QoS Parameters IE contained in the PDU Session Resource Setup Info—SN terminated IE or the PDU Session Resource Modification Info—SN terminated IE, the S-NG-RAN node shall store this information, and, if supported, perform delay measurement and QoS monitoring as specified in 3GPP TS 23.501. In case such a QoS flow is included in the DRBs To Be Setup List IE or the DRBs To Be Modified List IE within the PDU Session Resource Setup Response Info—SN terminated IE or the PDU Session Resource Modification Response Info—SN terminated IE, the M-NG-RAN node shall, if supported, use it to configure lower layers for the purpose of delay measurement and QoS monitoring.

Interactions with the S-NG-RAN node Reconfiguration Completion procedure include the following. If the S-NG-RAN node admits a modification of the UE context requiring the M-NG-RAN node to report about the success of the RRC connection reconfiguration procedure, the S-NG-RAN node shall start the timer TXnDCoverall when sending the S-NODE MODIFICATION REQUEST ACKNOWLEDGE message to the M-NG-RAN node. The reception of the S-NG-RAN node RECONFIGURATION COMPLETE message shall stop the timer TXnDCoverall.

Interaction with the Activity Notification procedure includes the following. Upon receiving an S-NODE MODIFICATION REQUEST message containing the Desired Activity Notification Level IE, the S-NG-RAN node shall, if supported, use this information to decide whether to trigger subsequent Activity Notification procedures, or stop or modify ongoing triggering of these procedures due to a previous request.

Interaction with the Xn-U Address Indication procedure includes the following. For QoS flow mapped to DRBs configured with an SN terminated bearer option and removed from the SDAP in the S-NG-RAN node the S-NG-RAN node may provide data forwarding related information in the S-NODE MODIFICATION REQUEST ACKNOWLEDGE within the Data Forwarding and offloading Info from source NG-RAN node IE, in which case the M-NG-RAN node may decide to provide data forwarding addresses to the S-NG-RAN node and trigger the Xn-U Address Indication procedure as specified in 3GPP TS 37.340.

Figure 8:
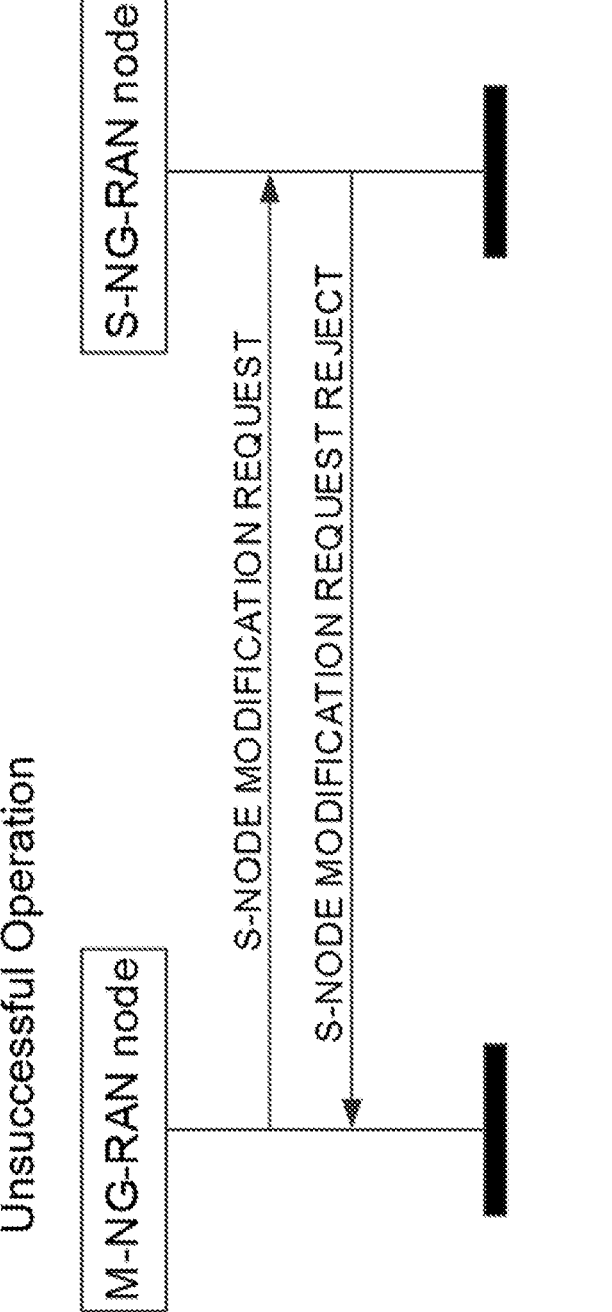
FIG. 8 illustrates a M-NG-RAN nod-initiated S-NG-RAN node Modification Preparation where the operation is unsuccessful, according to certain embodiments.

FIG. 8 illustrates a M-NG-RAN nod-initiated S-NG-RAN node Modification Preparation where the operation is unsuccessful, according to certain embodiments. As depicted, for QoS flow offloading from the S-NG-RAN node to the M-NG-RAN, the S-NG-RAN node may provide the data forwarding related information in the S-NODE MODIFICATION REQUEST ACKNOWLEDGE within the Data Forwarding and offloading Info from source NG-RAN node IE, in which case the M-NG-RAN node may decide to provide data forwarding addresses to the S-NG-RAN node and trigger the Xn-U Address Indication procedure as specified in 3GPP TS 37.340.

If the S-NG-RAN node does not admit any modification requested by the M-NG-RAN node, or a failure occurs during the M-NG-RAN node initiated S-NG-RAN node Modification Preparation, the S-NG-RAN node shall send the S-NODE MODIFICATION REQUEST REJECT message to the M-NG-RAN node. The message shall contain the Cause IE with an appropriate value.

If the S-NG-RAN node receives a S-NODE MODIFICATION REQUEST message containing the M-NG-RAN node to S-NG-RAN node Container IE that does not include required information as specified in 3GPP TS 37.340, the S-NG-RAN node shall send the S-NODE MODIFICATION REQUEST REJECT message to the M-NG-RAN node.

If the S-NG-RAN node receives an S-NODE MODIFICATION REQUEST message including a PDU Session Resources To Be Added Item IE, containing neither the PDU Session Resource Setup Info—SN terminated IE nor the PDU Session Resource Setup Info—MN terminated IE, the S-NG-RAN node shall fail the S-NG-RAN node Modification Preparation procedure indicating an appropriate cause.

If the S-NG-RAN node receives an S-NODE MODIFICATION REQUEST message including a PDU Session Resources To Be Modified Item IE, containing neither the PDU Session Resource Modification Info—SN terminated IE nor the PDU Session Resource Modification Info—MN terminated IE, the S-NG-RAN node shall fail the S-NG-RAN node Modification Preparation procedure indicating an appropriate cause.

If the S-NG-RAN node receives an S-NODE MODIFICATION REQUEST message containing multiple PDU Session ID IEs (in the PDU Session Resources To Be Released List IE) set to the same value, the S-NG-RAN node shall initiate the release of one corresponding PDU Session and ignore the duplication of the instances of the selected corresponding PDU Sessions.

If the supported algorithms for encryption defined in the NR Encryption Algorithms IE in the NR UE Security Capabilities IE in the UE Context Information IE, plus the mandated support of NEA0 in all UEs (3GPP TS 33.501), do not match any algorithms defined in the configured list of allowed encryption algorithms in the S-NG-RAN node (3GPP TS 33.501), the S-NG-RAN node shall reject the procedure using the S-NODE MODIFICATION REQUEST REJECT message.

If the supported algorithms for integrity defined in the NR Integrity Protection Algorithms IE in the NR UE Security Capabilities IE in the UE Context Information IE do not match any algorithms defined in the configured list of allowed integrity protection algorithms in the S-NG-RAN node (3GPP TS 33.501), the S-NG-RAN node shall reject the procedure using the S-NODE MODIFICATION REQUEST REJECT message.

If the timer $TXn_{DCprep}$ expires before the M-NG-RAN node has received the S-NODE MODIFICATION REQUEST ACKNOWLEDGE message, the M-NG-RAN node shall regard the M-NG-RAN node initiated S-NG-RAN node Modification Preparation procedure as being failed and shall release the UE Context at the S-NG-RAN node.

If the Lower Layer presence status change IE set to "re-establish lower layers" is included in the S-NODE MODIFICATION REQUEST message and was not set to "release lower layers" before, the S-NG-RAN node shall ignore the IE.

If the S-NG-RAN node receives an S-NODE MODIFICATION REQUEST message containing, for a PDU session, a PDU Session Resource Setup Info—SN terminated IE for which the Split Session Indicator IE is included and set to "split", the Security Result IE is not included, and either the Integrity Protection Indication IE or the Confidentiality Protection Indication IE is set to "preferred", it shall reject the PDU session.

Interactions with the S-NG-RAN node Reconfiguration Completion and S-NG-RAN node initiated S-NG-RAN node Release procedure include the following. If the timer TXnDCoverall expires before the S-NG-RAN node has received the S-NODE RECONFIGURATION COMPLETE or the S-NODE RELEASE REQUEST message, the S-NG- RAN node shall regard the requested modification RRC connection reconfiguration as being not applied by the UE and shall trigger the S-NG-RAN node initiated S-NG-RAN node Release procedure.

Interaction with the S-NG-RAN node initiated S-NG-RAN node Modification Preparation procedure includes the following. If the M-NG-RAN node, after having initiated the M-NG-RAN node initiated S-NG-RAN node Modification procedure, receives the S-NODE MODIFICATION REQUIRED message, the M-NG-RAN node shall refuse the S-NG-RAN node initiated S-NG-RAN node Modification procedure with an appropriate cause value in the Cause IE.

If the M-NG-RAN node has a Prepared S-NG-RAN node Modification and receives the S-NODE MODIFICATION REQUIRED message, the M-NG-RAN node shall respond with the S-NODE MODIFICATION REFUSE message to the S-NG-RAN node with an appropriate cause value in the Cause IE.

Interaction with the M-NG-RAN node initiated S-NG-RAN node Release procedure includes the following. If the M-NG-RAN node receives an S-NODE MODIFICATION REQUEST ACKNOWLEDGE message including a PDU Session Resources Admitted To Be Added Item IE, containing neither the PDU Session Resource Setup Response Info—SN terminated IE nor the PDU Session Resource Setup Response Info—MN terminated IE, the M-NG-RAN node shall trigger the M-NG-RAN node initiated S-NG-RAN node Release procedure indicating an appropriate cause.

If the M-NG-RAN node receives an S-NODE MODIFICATION REQUEST ACKNOWLEDGE message including a PDU Session Resources Admitted To Be Modified Item IE, containing neither the PDU Session Resource Modification Response Info—SN terminated IE nor the PDU Session Resource Modification Response Info—MN terminated IE, the M-NG-RAN node shall trigger the M-NG-RAN node initiated S-NG-RAN node Release procedure indicating an appropriate cause.

If the timer $TXn_{DCprep}$ expires before the M-NG-RAN node has received the S-NODE MODIFICATION REQUEST ACKNOWLEDGE message, the M-NG-RAN node shall regard the S-NG-RAN node Modification Preparation procedure as being failed and may trigger the M-NG-RAN node initiated S-NG-RAN node Release procedure.

The S-NODE MODIFICATION REQUEST ACKNOWLEDGE message is sent by the S-NG-RAN node to confirm the M-NG-RAN node's request to modify the S-NG-RAN node resources for a specific UE. The S-NG-RAN node transmits the message to the M-NG-RAN node.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| M-NG-RAN node UE XnAP ID | M | | NG-RAN node UE XnAP ID 9.2.3.16 | Allocated at the M-NG-RAN node | YES | ignore |
| S-NG-RAN node UE XnAP ID | M | | NG-RAN node UE XnAP ID 9.2.3.16 | Allocated at the S-NG-RAN node | YES | ignore |
| PDU Session Resources Admitted List | | 0 . . . 1 | | | YES | ignore |
| >PDU Session Resources Admitted To Be Added List | | 0 . . . 1 | | | | — |
| >>PDU Session Resources Admitted To Be Added Item | | 1 . . . <max-noofPDUSessions> | | NOTE: If neither the PDU Session Resource Setup Response Info - SN terminated IE nor the PDU Session Resource Setup Response Info - MN terminated IE is present in a PDU Session Resources Admitted To Be Added Item IE, abnormal conditions as specified in clause 8.3.3.4 apply. | | — |

-continued

| IE/Group Name | Presence | Range | IE type and reference | Semantics description | Criti-cality | Assigned Criti-cality |
|---|---|---|---|---|---|---|
| >>>PDU Session ID | M | | 9.2.3.18 | | — | |
| >>>PDU Session Resource Setup Response Info - SN terminated | O | | 9.2.1.6 | | — | |
| >>>PDU Session Resource Setup Response Info - MN terminated | O | | 9.2.1.8 | | — | |
| >PDU Session Resources Admitted To Be Modified List | | 0 . . . 1 | | | — | |
| >>PDU Session Resources Admitted To Be Modified Item | | 1 . . . <max-noofPDUSes-sions> | | NOTE: If neither the PDU Session Resource Modification Response Info - SN terminated IE nor the PDU Session Resource Modification Response Info - MN terminated IE is present in a PDU Session Resources Admitted To Be Modified Item IE, abnormal conditions as specified in clause 8.3.3.4 apply. | — | |
| >>>PDU Session ID | M | | 9.2.3.18 | | — | |
| >>>PDU Session Resource Modification Response Info - SN terminated | O | | 9.2.1.10 | | — | |
| >>>PDU Session Resource Modification Response Info - MN terminated | O | | 9.2.1.12 | | — | |
| >PDU Session Resources Admitted To Be Released List | | 0 . . . 1 | | | — | |
| >>PDU Session Resources admitted to be released List - SN terminated | O | | PDU session List with data forwarding request info 9.2.1.24 | | — | |
| >>PDU Session Resources admitted to be released List - MN terminated | O | | PDU session List with data Cause 9.2.1.26 | | — | |

-continued

| IE/Group Name | Presence | Range | IE type and reference | Semantics description | Criti-cality | Assigned Criti-cality |
|---|---|---|---|---|---|---|
| PDU Session Resources Not Admitted to be Added List | O | | PDU session List 9.2.1.27 | | YES | ignore |
| S-NG-RAN node to M-NG-RAN node Container | O | | OCTET STRING | Includes the CG-Config message as defined in subclause 11.2.2 of TS 38.331 [10]. | YES | ignore |
| Admitted Split SRBs | O | | ENUMER-ATED (srb1, srb2, srb1&2, . . . ) | Indicates admitted SRBs | YES | ignore |
| Admitted Split SRBs release | O | | ENUMER-ATED (srb1, srb2, srb1&2, . . . ) | Indicates admitted SRBs release | YES | ignore |
| Criticality Diagnostics | O | | 9.2.3.3 | | YES | ignore |
| Location Information at S-NODE | O | | Target Cell Global ID 9.2.3.25 | Contains information to support localization of the UE | YES | ignore |
| MR-DC Resource Coordination Information | O | | 9.2.2.33 | Information used to coordinate resource utilization between M-NG-RAN node and S-NG-RAN node. | YES | Ignore |
| PDU Session Resources with Data Forwarding List | | 0 . . . 1 | | | YES | ignore |
| >PDU Session Resources with Data Forwarding List - SN terminated | M | | PDU session List with data forwarding request info 9.2.1.24 | | — | |
| RRC Config Indication | O | | 9.2.3.72 | | YES | reject |
| Available fast MCG recovery via SRB3 | O | | ENU-MERATED {true, . . . } | Indicates the fast MCG recovery via SRB3 is available. | YES | ignore |
| Release fast MCG recovery via SRB3 | O | | ENU-MERATED {true, . . . } | Indicates the fast MCG recovery via SRB3 is released. | YES | ignore |
| S-NG-RAN node CPAC Configuration Container | O | | OCTET STRING | Includes the conditionalRecon-ifguration message as defined in subclause 11.2.2 of TS 38.331 [10]. | YES | ignore |

| Range bound | Explanation |
|---|---|
| maxnoofPDUSessions | Maximum no. of PDU sessions. Value is 256 |

Figure 9:
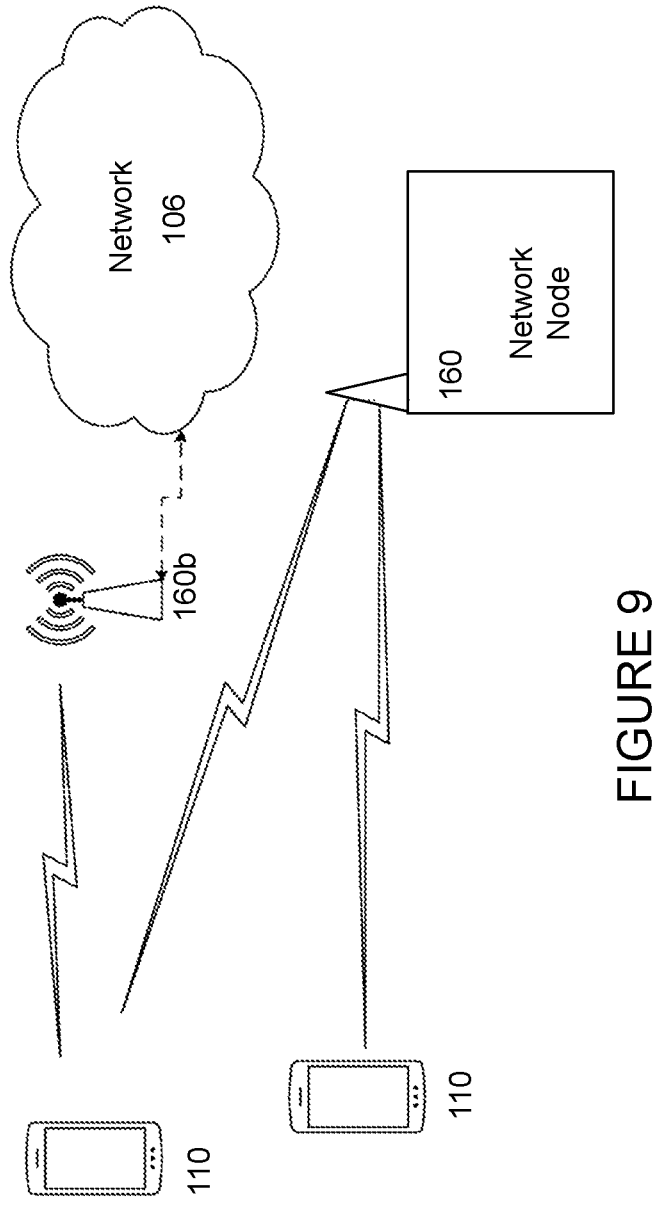
FIG. 9 illustrates an example wireless network, according to certain embodiments.

FIG. 9 illustrates a wireless network in accordance with some embodiments. Although the subject matter described herein may be implemented in any appropriate type of system using any suitable components, the embodiments disclosed herein are described in relation to a wireless network, such as the example wireless network illustrated in FIG. 9. For simplicity, the wireless network of FIG. 9 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 10:
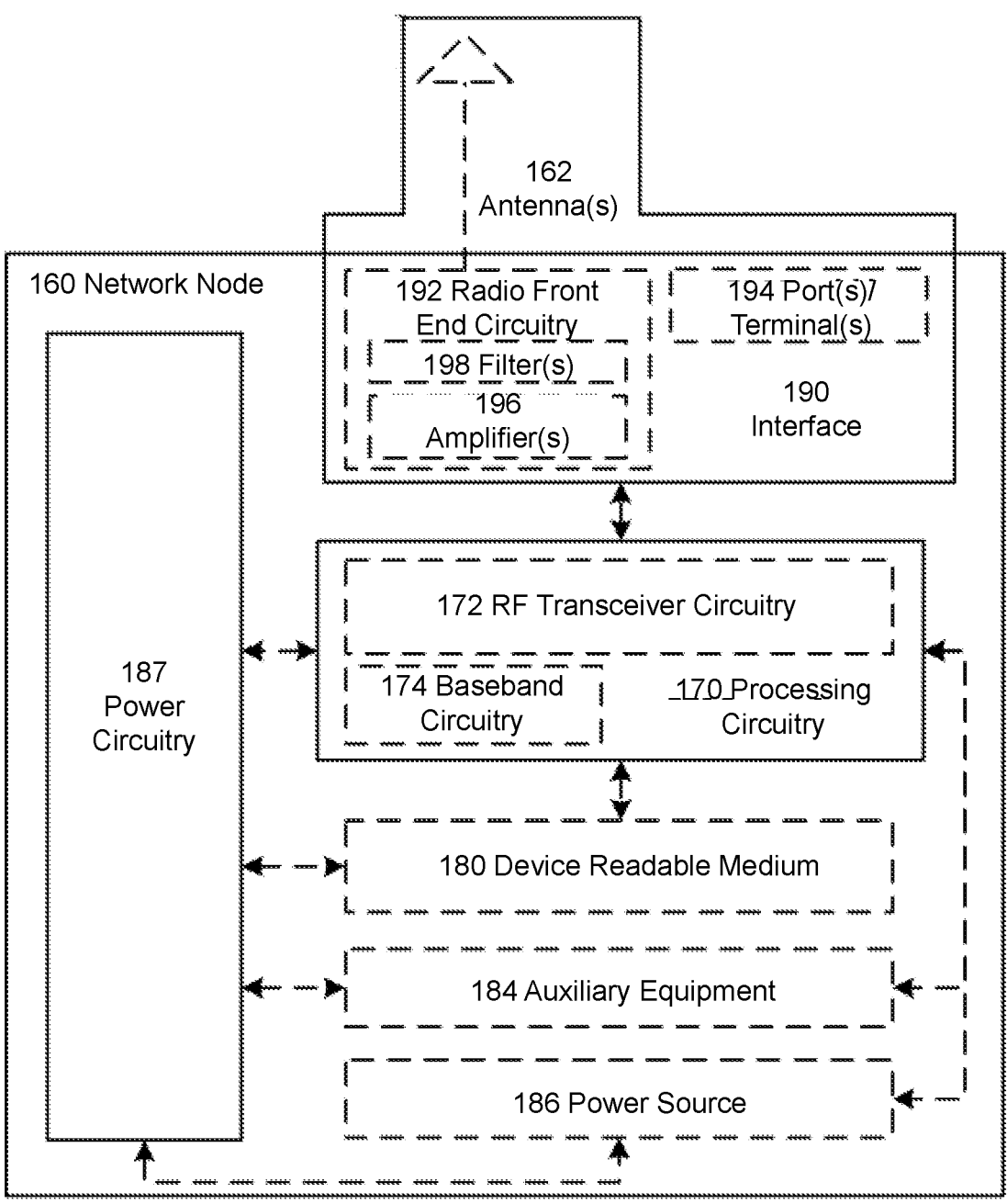
FIG. 10 illustrates an example network node, according to certain embodiments.

FIG. 10 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmis- sion nodes, multi-cell/multicast coordination entities (MCEs), core network nodes (e.g., Mobile Switching Centers (MSCs), Mobility Management Entities (MMEs)), Operation & Maintenance (O&M) nodes, Operations Support System (OSS) nodes, Self Optimized Network (SON) nodes, positioning nodes (e.g., Evolved-Serving Mobile Location Centres (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 160 includes processing circuitry 170, device readable medium 180, interface 190, auxiliary equipment 184, power source 186, power circuitry 187, and antenna 162. Although network node 160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile communication (GSM), Wideband Code Division Multiplexing Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 10 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 11:
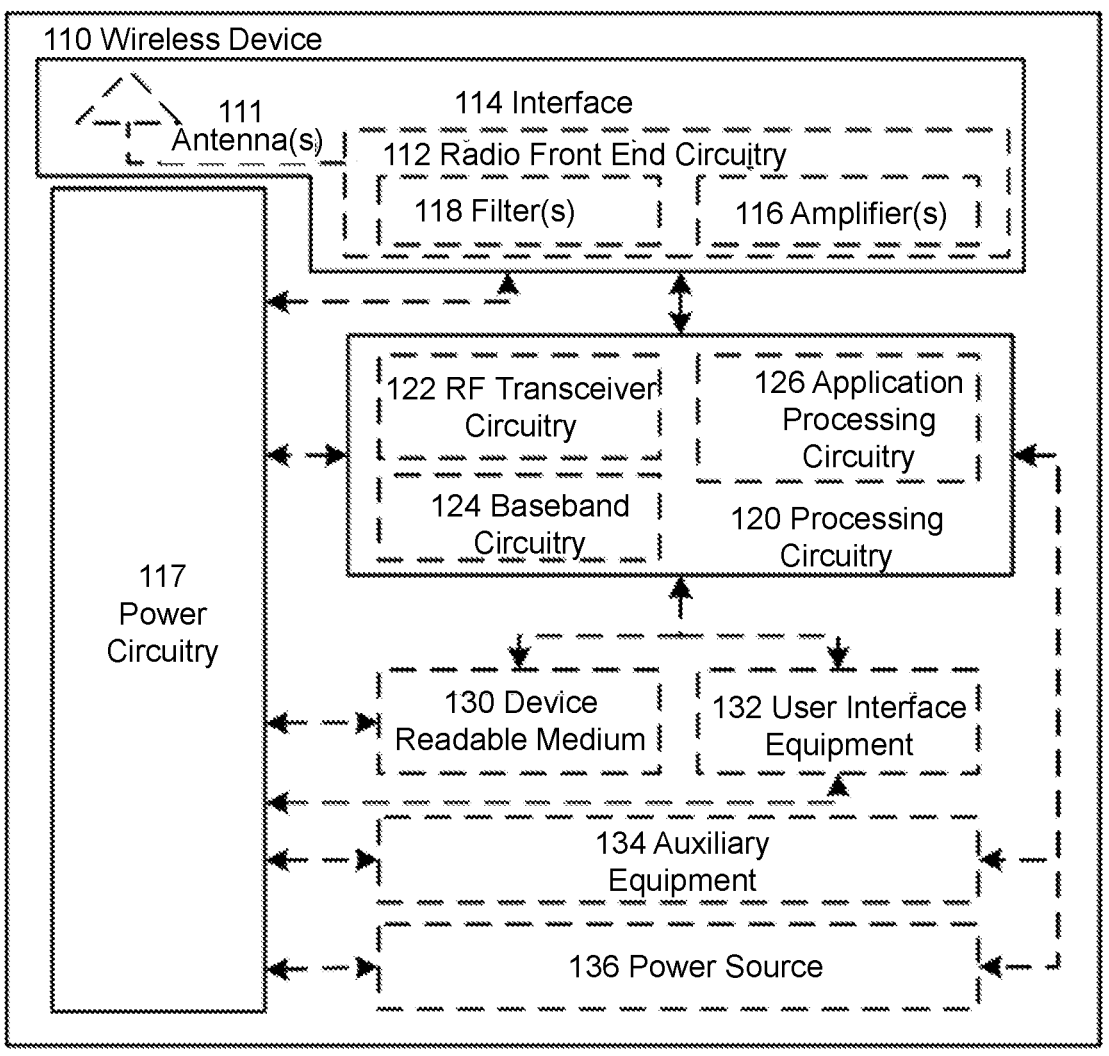
FIG. 11 illustrates an example wireless device, according to certain embodiments.

FIG. 11 illustrates an example wireless device 110, according to certain embodiments. As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 12:
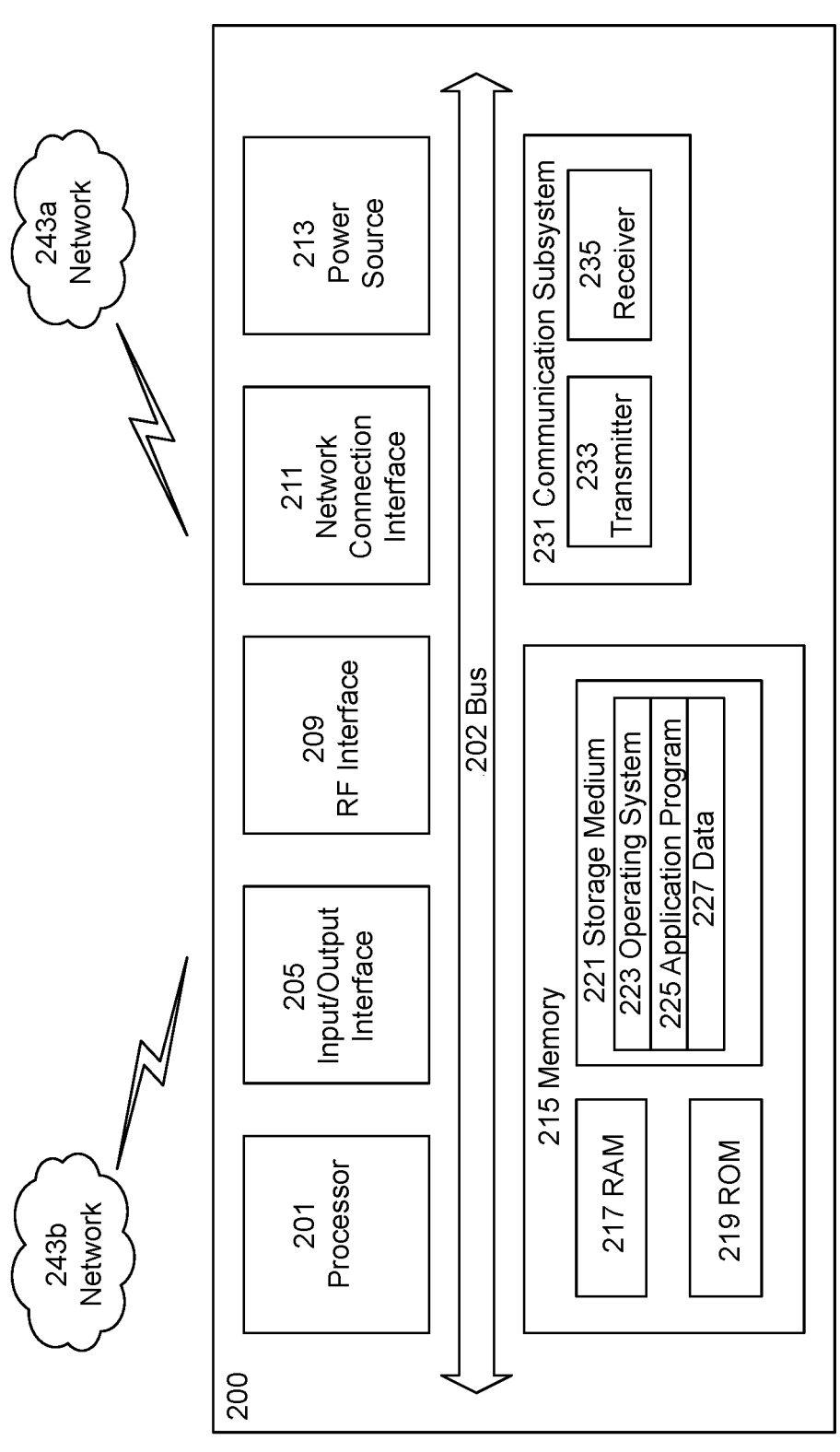
FIG. 12 illustrate an example user equipment, according to certain embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 12, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 13:
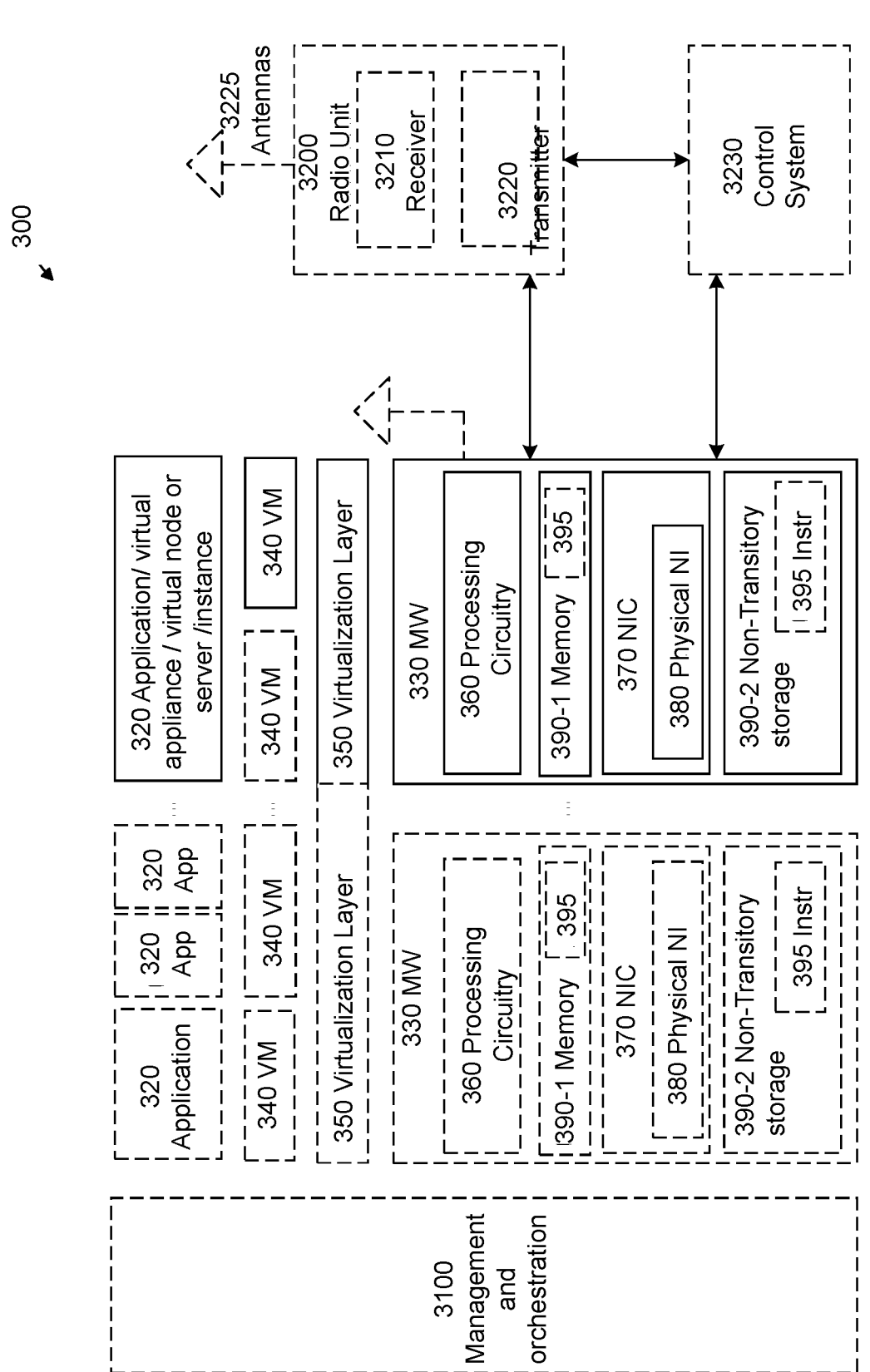
FIG. 13 illustrates a virtualization environment in which functions implemented by some embodiments may be virtualized, according to certain embodiments.

FIG. 13 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 13, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 13.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 14:
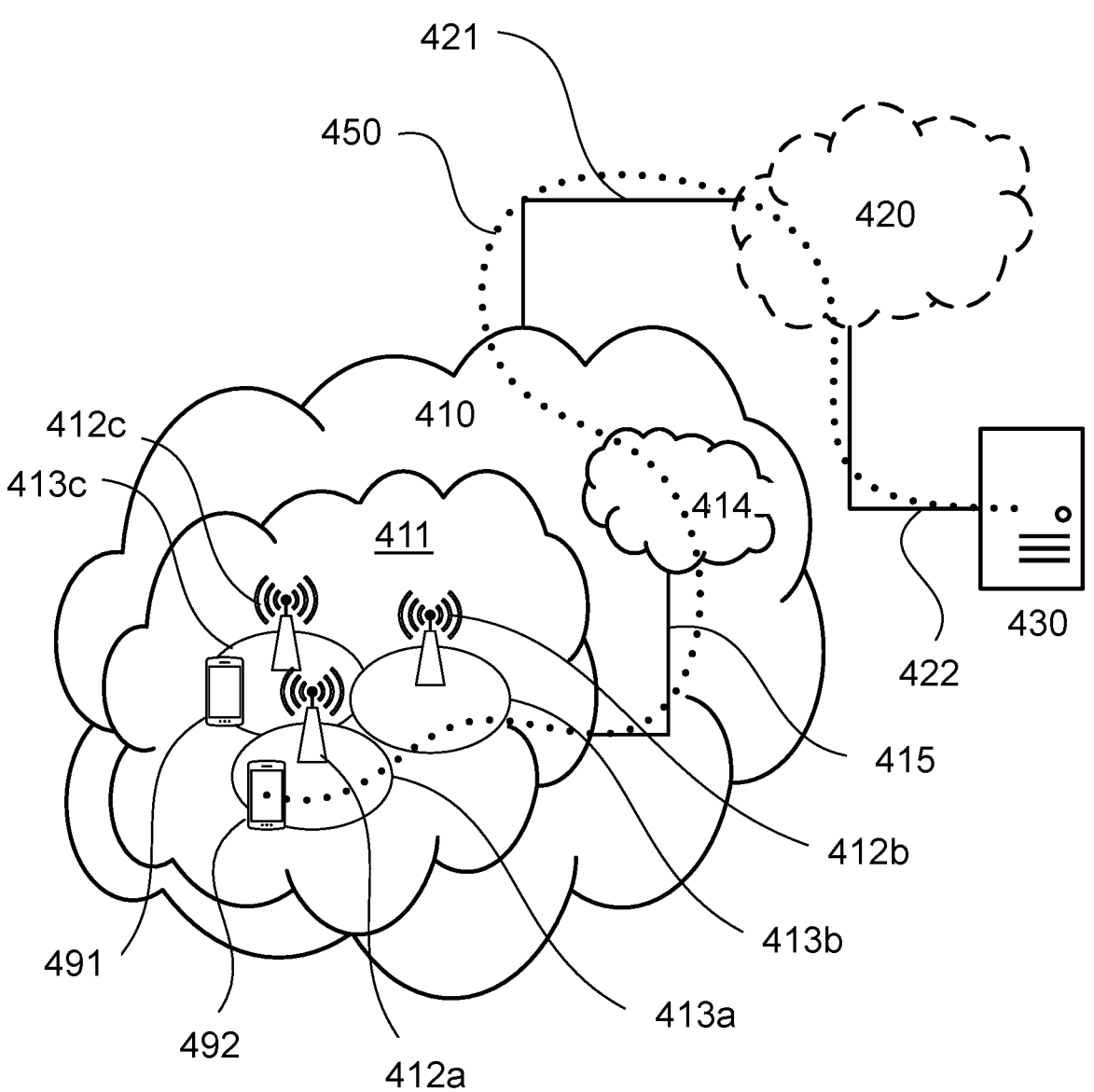
FIG. 14 illustrates a telecommunication network connected via an intermediate network to a host computer, according to certain embodiments.

FIG. 14 illustrates a telecommunication network connected via an intermediate network to a host computer in accordance with some embodiments. With reference to FIG. 14, in accordance with an embodiment, a communication system includes telecommunication network 410, such as a 3GPP-type cellular network, which comprises access network 411, such as a radio access network, and core network

414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 14 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 15:
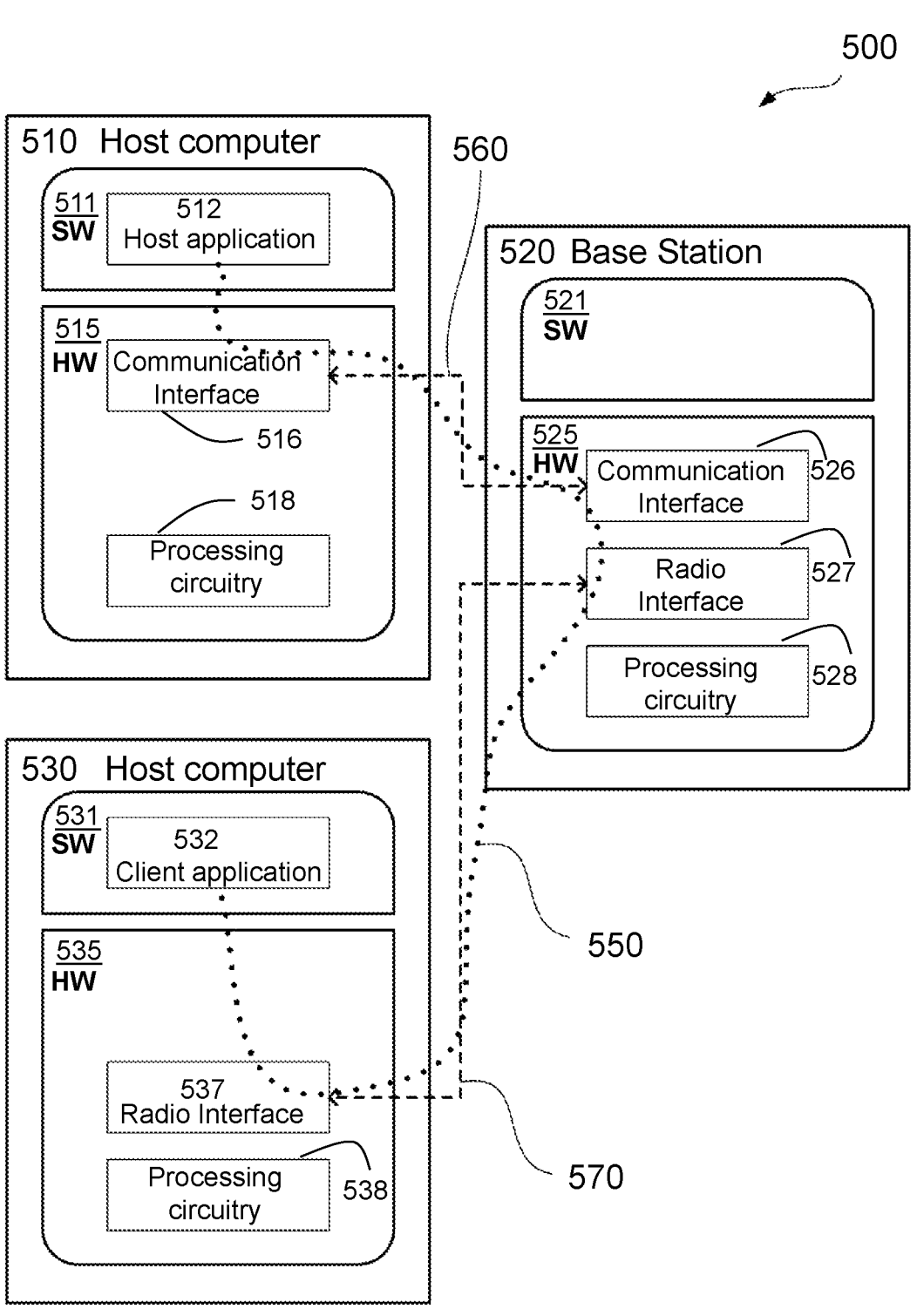
FIG. 15 illustrates a generalized block diagram of a host computer communicating via a base station with a user equipment over a partially wireless connection, according to certain embodiments.

FIG. 15 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 15. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 15) served by base station 520. Communication interface 526 may be configured to facilitate connection 560 to host computer 510. Connection 560 may be direct or it may pass through a core network (not shown in FIG. 15) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 15 may be similar or identical to host computer 430, one of base stations 412*a*, 412*b*, 412*c* and one of UEs 491, 492 of FIG. 14, respectively. This is to say, the inner workings of these entities may be as shown in FIG. 15 and independently, the surrounding network topology may be that of FIG. 14.

In FIG. 15, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 16, 17:
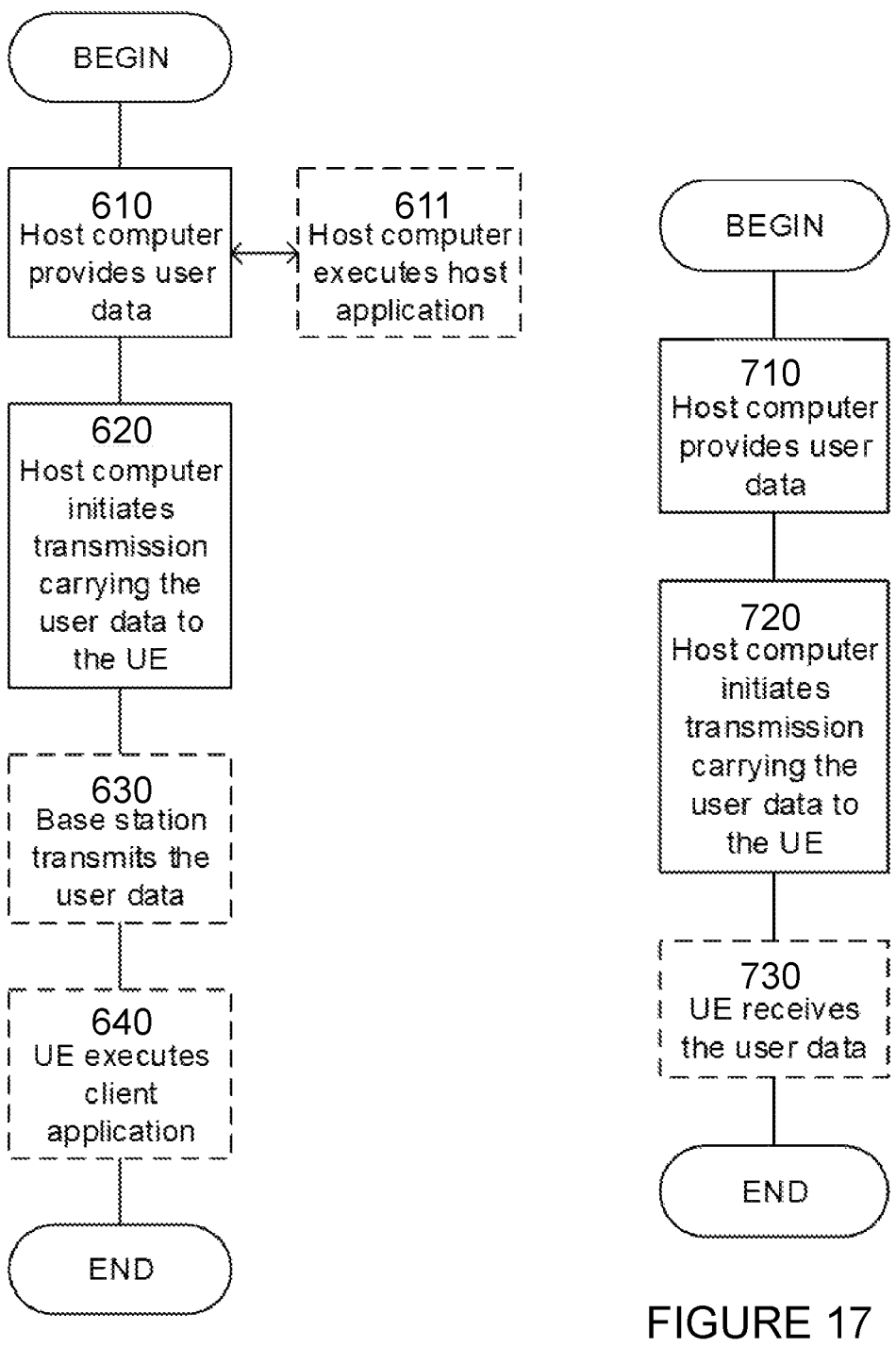
FIG. 16 illustrates a method implemented in a communication system, according to one embodiment.
FIG. 17 illustrates another method implemented in a communication system, according to one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 18, 19:
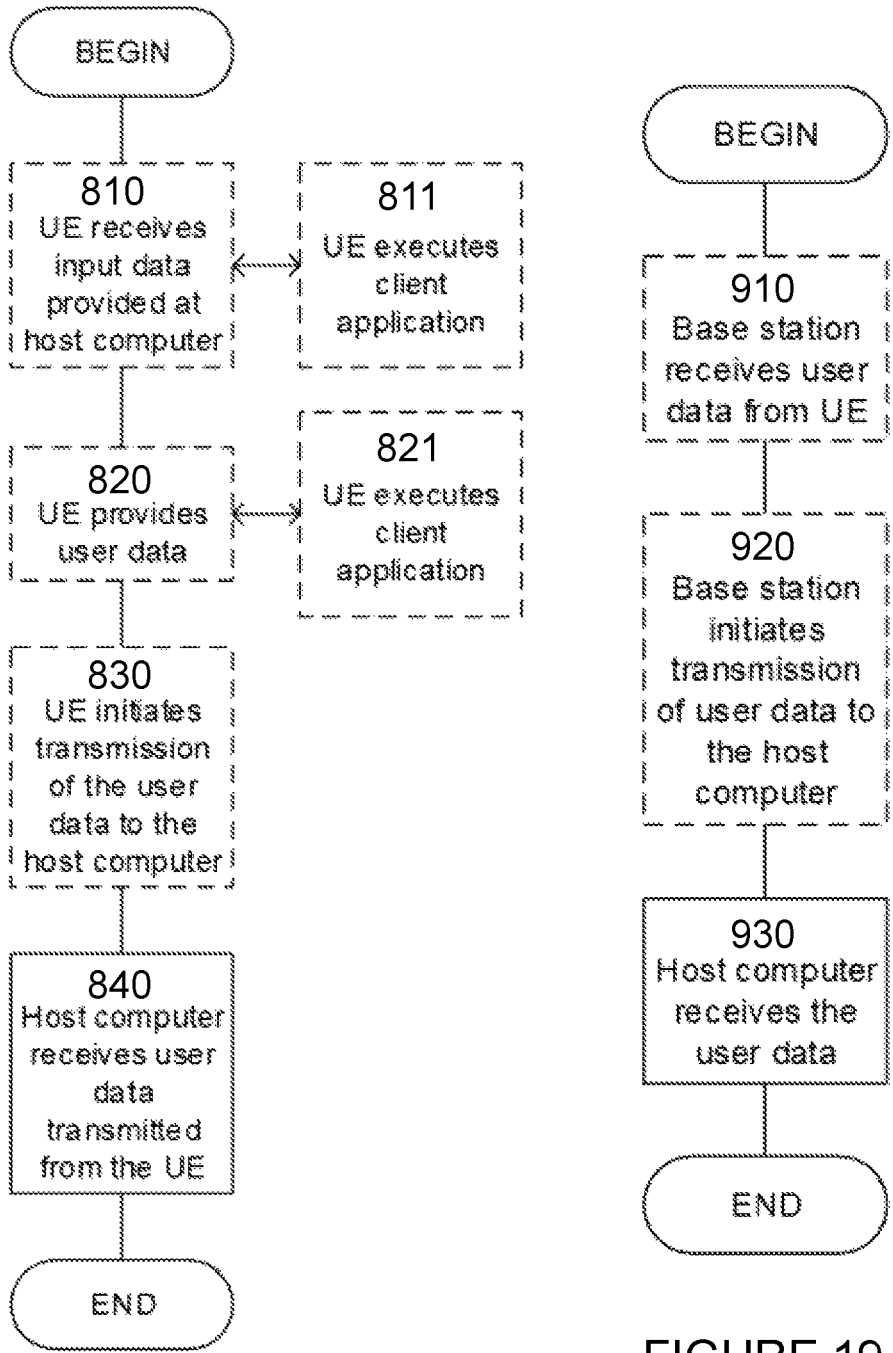
FIG. 18 illustrates another method implemented in a communication system, according to one embodiment.
FIG. 19 illustrates another method implemented in a communication system, according to one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figures 20, 21:
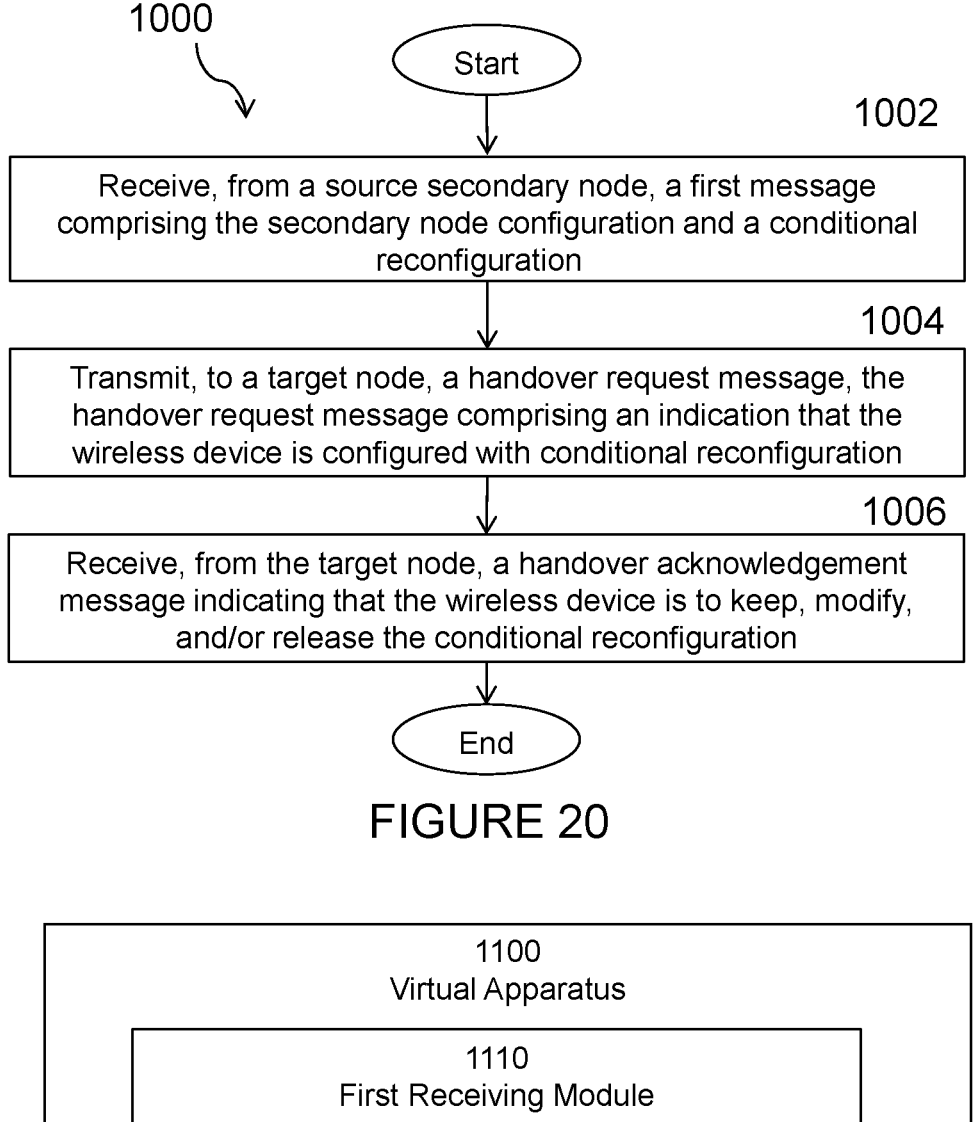
FIG. 20 illustrates an example method by a wireless device, according to certain embodiments.
FIG. 21 illustrates an exemplary virtual computing device, according to certain embodiments.

FIG. 20 depicts a method by network node 160 operating as a source master node performing a handover of a wireless device to a target node, according to certain embodiments. At step 1002, the source master node receives, from a source secondary node, a first message comprising the secondary node configuration and a conditional reconfiguration. At step 1004, the source master node transmits, to the target node, a handover request message. The handover request message comprises an indication that the wireless device 110 is configured with the conditional reconfiguration. At step 1106, the source master node receives, from the target node, a handover acknowledgement message indicating that the wireless device 110 is to keep, modify, and/or release the conditional reconfiguration.

In a particular embodiment, the conditional reconfiguration comprises a CPC configuration and/or CPA configuration.

In a particular embodiment, the source master node delays a transmission of a release request message to the source secondary node.

In a particular embodiment, the source master node transmits, to the wireless device 110, a second message indicating that the wireless device 110 is to keep, modify, and/or release the conditional reconfiguration.

In a particular embodiment, prior to receiving the first message, the source master node transmits, to the source secondary node, a secondary node modification request message requesting the secondary node configuration associated with the wireless device. In a further particular embodiment, the secondary node modification request message comprises at least one of: a SN Modification Request; a S-NODE MODIFICATION REQUEST message; a SENB MODIFICATION REQUEST message; a SGNB MODIFICATION REQUEST message; and an SGNB MODIFICATION REQUEST message.

In a further particular embodiment, the secondary node modification request message requests the conditional reconfiguration for the wireless device.

In a particular embodiment, the conditional reconfiguration comprises at least one of: at least one RRC Reconfiguration, at least one measID associated to the at least one RRC Reconfiguration, and at least one measurement configuration associated with the at least one measID.

In a particular embodiment, the first message comprises at least one of: a SN Modification Request Acknowledge; a S-NODE MODIFICATION REQUEST ACKNOWLEDGE message; a SENB MODIFICATION REQUEST ACKNOWLEDGE message; a SGNB MODIFICATION REQUEST ACKNOWLEDGE message; and a SGNB MODIFICATION REQUEST ACKNOWLEDGE message.

In a particular embodiment, the first message includes a CG-Config containing the conditional reconfiguration.

In a particular embodiment, the handover request message comprises the conditional reconfiguration.

In a particular embodiment, the handover request message comprises a UE context ID associated with the source secondary node.

In a particular embodiment, the handover request message comprises at least one of: a HandoverPreparationInformation message; an inter-node RRC message; and an XnAP inter-node message.

FIG. 21 illustrates a schematic block diagram of a virtual apparatus 1100 in a wireless network (for example, the wireless network shown in FIG. 9). The apparatus may be implemented in a wireless device or network node (e.g., wireless device 110 or network node 160 shown in FIG. 9). Apparatus 1100 is operable to carry out the example method described with reference to FIG. 20 and possibly any other processes or methods disclosed herein. It is also to be understood that the method of FIG. 20 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause first receiving module 1110, transmitting module 1120, second receiving module 1130, and any other suitable units of apparatus 1100 to perform corresponding functions according one or more embodiments of the present disclosure.

According to certain embodiments, first receiving module 1110 may perform certain of the receiving functions of the apparatus 1100. For example, first receiving module 1110 may receive, from a source secondary node, a first message comprising the secondary node configuration and a conditional reconfiguration.

According to certain embodiments, transmitting module 1120 may perform certain of the transmitting functions of the apparatus 1100. For example, transmitting module 1120 may transmit, to the target node, a handover request message. The handover request message comprises an indication that the wireless device 110 is configured with the conditional reconfiguration.

According to certain embodiments, second receiving module 1120 may perform certain other of the receiving functions of the apparatus 1100. For example, second receiving module 1120 may receive, from the target node, a handover acknowledgement message indicating that the wireless device 110 is to keep, modify, and/or release the conditional reconfiguration.

FIG. 22 depicts a method by network node 160 operating as a target node performing a handover of a wireless device from a source master node to the target node, according to certain embodiments. At step 1202, the target node receives, from the source master node, a handover request message requesting handover of the wireless device from the source master node to the target node. The handover request includes an indication that the wireless device is configured with a conditional reconfiguration. At step 1204, the target node transmits, to the source master node, a handover acknowledgement message indicating that the wireless device is to keep, modify, and/or release the conditional reconfiguration.

In a particular embodiment, the conditional reconfiguration comprises a CPC configuration and/or CPA configuration.

In a particular embodiment, the conditional reconfiguration comprises at least one of: at least one RRC Reconfiguration; at least one measID, associated to the at least one RRC Reconfiguration; and at least one measurement configuration associated with the at least one measID.

In a particular embodiment, the handover request message comprises the conditional reconfiguration.

In a particular embodiment, the handover request message comprises at least one of: a HandoverPreparationInformation message; an inter-node RRC message; and an XnAP inter-node message.

In a particular embodiment, the handover request message comprises a UE context ID associated with a source secondary node, and the target node stores the UE context ID and transmits, to a target secondary node, a second message comprising the UE context ID. In a further particular embodiment, the target secondary node is the source secondary node.

In a particular embodiment, the second message comprises at least one of: a S-Node ADDITION/MODIFICATION REQUEST; a SENB ADDITION/MODIFICATION REQUEST; and a SGNB ADDITION/MODIFICATION REQUEST.

In a particular embodiment, the second message comprises the conditional reconfiguration.

In a particular embodiment, the target node receives, from the source secondary node, a response message including an indication to remove, add, and/or modify the conditional reconfiguration.

In a particular embodiment, the response message from the source secondary node comprises at least one of: a S-Node ADDITION/MODIFICATION REQUEST ACKNOWLEDGE; a SENB ADDITION/MODIFICATION REQUEST ACKNOWLEDGE; and a SGNB ADDITION/ MODIFICATION REQUEST ACKNOWLEDGE.

In a particular embodiment, the target node comprises a target master node.

FIG. 23 illustrates a schematic block diagram of a virtual apparatus 1300 in a wireless network (for example, the wireless network shown in FIG. 9). The apparatus may be implemented in a wireless device or network node (e.g., wireless device 110 or network node 160 shown in FIG. 9). Apparatus 1300 is operable to carry out the example method described with reference to FIG. 22 and possibly any other processes or methods disclosed herein. It is also to be understood that the method of FIG. 22 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1310, transmitting module 1320, and any other suitable units of apparatus 1300 to perform corresponding functions according one or more embodiments of the present disclosure.

According to certain embodiments, receiving module 1310 may perform certain of the receiving functions of the apparatus 1300. For example, receiving module 1310 may receive, from the source master node, a handover request message requesting handover of the wireless device from the source master node to the target node. The handover request includes an indication that the wireless device is configured with a conditional reconfiguration.

According to certain embodiments, transmitting module 1320 may perform certain of the transmitting functions of the apparatus 1300. For example, transmitting module 1320 may transmit, to the source master node, a handover acknowledgement message indicating that the wireless device is to keep, modify, and/or release the conditional reconfiguration.

The invention claimed is:

1. A method performed by a source master node performing a handover of a wireless device to a target node, the method comprising:
  receiving, from a source secondary node, a first message comprising a secondary node configuration and a conditional reconfiguration;
  transmitting, to the target node, a handover request message, the handover request message comprising an indication that the wireless device is configured with the conditional reconfiguration; and
  receiving, from the target node, a handover acknowledgement message indicating that the wireless device is to keep, modify, or release the conditional reconfiguration.

2. The method of claim 1, wherein the conditional reconfiguration comprises a Conditional Primary Secondary Cell (PSCell) Change, CPC, configuration or Conditional PSCell Addition, CPA, configuration.

3. The method of claim 1, further comprising delaying a transmission of a release request message to the source secondary node.

4. The method of claim 1, further comprising transmitting, to the wireless device, a second message indicating that the wireless device is to keep, modify, or release the conditional reconfiguration.

5. The method of claim 1, further comprising:
  prior to receiving the first message, transmitting, to the source secondary node, a secondary node modification request message requesting the secondary node configuration associated with the wireless device.

6. The method of claim 5, wherein the secondary node modification request message comprises at least one of:
  a Secondary Node (SN) Modification Request;
  a S-NODE MODIFICATION REQUEST message;
  a SENB MODIFICATION REQUEST message; and
  a SGNB MODIFICATION REQUEST message.

7. The method of claim 5, wherein the secondary node modification request message requests the conditional reconfiguration for the wireless device.

8. The method of claim 1, wherein the conditional reconfiguration comprises at least one of:
  at least one Radio Resource Control, RRC, Reconfiguration;

at least one measurement identifier, measID, associated to the at least one RRC Reconfiguration; and
  at least one measurement configuration associated with the at least one measID.

9. The method of claim 1, wherein the first message comprises at least one of:
  a SN Modification Request Acknowledge;
  a S-NODE MODIFICATION REQUEST ACKNOWLEDGE message;
  a SENB MODIFICATION REQUEST ACKNOWLEDGE message; and
  a SGNB MODIFICATION REQUEST ACKNOWLEDGE message.

10. The method of claim 1, wherein the first message includes a Cell Group (CG)-Config containing the conditional reconfiguration.

11. The method of claim 1, wherein the handover request message comprises the conditional reconfiguration.

12. The method of claim 1, wherein the handover request message comprises a user equipment context identifier, UE context ID, associated with the source secondary node.

13. The method of claim 1, wherein the handover request message comprises at least one of:
  a HandoverPreparationInformation message;
  an inter-node Radio Resource Control, RRC, message; and
  an XnAP inter-node message.

14. A source master node performing a handover of a wireless device to a target node, the source master node comprising:
  processing circuitry configured to:
  receive, from a source secondary node, a first message comprising a secondary node configuration and a conditional reconfiguration;
  transmit, to the target node, a handover request message, the handover request message comprising an indication that the wireless device is configured with the conditional reconfiguration; and
  receive, from the target node, a handover acknowledgement message indicating that the wireless device is to keep, modify, or release the conditional reconfiguration.

15. A method performed by a target node performing a handover of a wireless device from a source master node for the wireless device, the method comprising:
  receiving, from the source master node, a handover request message requesting handover of the wireless device from the source master node to the target node, the handover request comprising an indication that the wireless device is configured with a conditional reconfiguration; and
  transmitting, to the source master node, a handover acknowledgement message indicating that the wireless device is to keep, modify, or release the conditional reconfiguration.

16. The method of claim 15, wherein the conditional reconfiguration comprises a Conditional Primary Secondary Cell (PSCell) Change, CPC, configuration or Conditional PSCell Addition, CPA, configuration.

17. The method claim 15, wherein the conditional reconfiguration comprises at least one of:
  at least one Radio Resource Control, RRC, Reconfiguration;
  at least one measurement identifier, measID, associated to the at least one RRC Reconfiguration; and
  at least one measurement configuration associated with the at least one measID.

18. The method of claim 15, wherein the handover request message comprises the conditional reconfiguration.

19. The method of claim 15, wherein the handover request message comprises at least one of:

a HandoverPreparationInformation message;

an inter-node Radio Resource Control, RRC, message; and an XnAP inter-node message.

20. The method of claim 15, wherein the handover request message comprises a user equipment context identifier, UE context ID, associated with a source secondary node, and the method further comprises:

storing the UE context ID; and transmitting, to a target secondary node, a second message comprising the UE context ID.

21. The method of claim 20, wherein the target secondary node is the source secondary node.

22. The method of claim 20, wherein the second message comprises at least one of:

a S-Node ADDITION/MODIFICATION REQUEST;

a SENB ADDITION/MODIFICATION REQUEST, and a SGNB ADDITION/MODIFICATION REQUEST.

23. The method of claim 20, wherein the second message comprises the conditional reconfiguration.

24. The method of claim 20, further comprising receiving, from the source secondary node, a response message including an indication to remove, add, or modify the conditional reconfiguration.

25. The method of claim 24, wherein the response message from the source secondary node comprises at least one of:

a S-Node ADDITION/MODIFICATION REQUEST ACKNOWLEDGE;

a SENB ADDITION/MODIFICATION REQUEST ACKNOWLEDGE; and a SGNB ADDITION/MODIFICATION REQUEST ACKNOWLEDGE.

26. A target node performing a handover of a wireless device from a source master node, the target node comprising:

processing circuitry configured to:

receive, from the source master node, a handover request message requesting handover of the wireless device from the source master node to the target node, the handover request comprising an indication that the wireless device is configured with a conditional reconfiguration; and transmit, to the source master node, a handover acknowledgement message indicating that the wireless device is to keep, modify, or release the conditional reconfiguration.

* * * * *